(12) United States Patent
Spears

(10) Patent No.: US 11,199,861 B2
(45) Date of Patent: Dec. 14, 2021

(54) INTEGRATED VARIABLE PRESSURE AND FLOW REGULATOR

(71) Applicant: Patrick Orrin Spears, Brentwood, CA (US)

(72) Inventor: Patrick Orrin Spears, Brentwood, CA (US)

(73) Assignee: CLEANNESTA LLC

( * ) Notice: Subject to any disclaimer, the term of this patent is extended or adjusted under 35 U.S.C. 154(b) by 0 days.

(21) Appl. No.: 17/213,403

(22) Filed: Mar. 26, 2021

(65) Prior Publication Data

US 2021/0216089 A1 Jul. 15, 2021

(51) Int. Cl.
*F16K 31/12* (2006.01)
*G05D 16/10* (2006.01)
*G05D 16/20* (2006.01)

(52) U.S. Cl.
CPC ......... *G05D 16/10* (2013.01); *G05D 16/2097* (2019.01); *Y10T 137/7761* (2015.04)

(58) Field of Classification Search
CPC ......... Y10T 137/7826; Y10T 137/7825; Y10T 137/87917; Y10T 137/7761
See application file for complete search history.

(56) References Cited

U.S. PATENT DOCUMENTS

| 5,329,966 | A  | * | 7/1994 | Fenimore | G05D 7/0635 |
| | | | | | 137/501 |
| 10,386,864 | B2 | * | 8/2019 | Kishine | G05D 7/0635 |
| 2001/0004903 | A1 | * | 6/2001 | Ohmi | G05D 7/0658 |
| | | | | | 137/613 |
| 2004/0144383 | A1 | * | 7/2004 | Thomas | A61M 16/12 |
| | | | | | 128/204.18 |
| 2016/0070271 | A1 | * | 3/2016 | Hirata | F16L 55/02718 |
| | | | | | 138/39 |

* cited by examiner

*Primary Examiner* — Robert K Arundale

(57) ABSTRACT

An integrated variable pressure and flow regulator comprising a manifold body, a pressure regulator, a flow control valve, a flow meter and a flow diverter. The manifold body includes a coupling face to which the pressure regulator is attached, a flow control valve cavity which receives the flow control valve, a flow meter cavity which receives the flow meter and a flow diverter cavity which receives the flow diverter. A central fluid transfer passageway of the manifold connects an inlet with outlet ports in fluid communication through the cavities. The pressure regulator maintains an outlet fluid pressure less than inlet fluid pressure as per a reducer pressure at outlet ports. The flow control valve maintains an outlet fluid flow rate, as per a flow rate setting, for the fluid flow at the outlet fluid pressure. The flow diverter allows to selectively divert the fluid through any of the outlet ports.

9 Claims, 19 Drawing Sheets

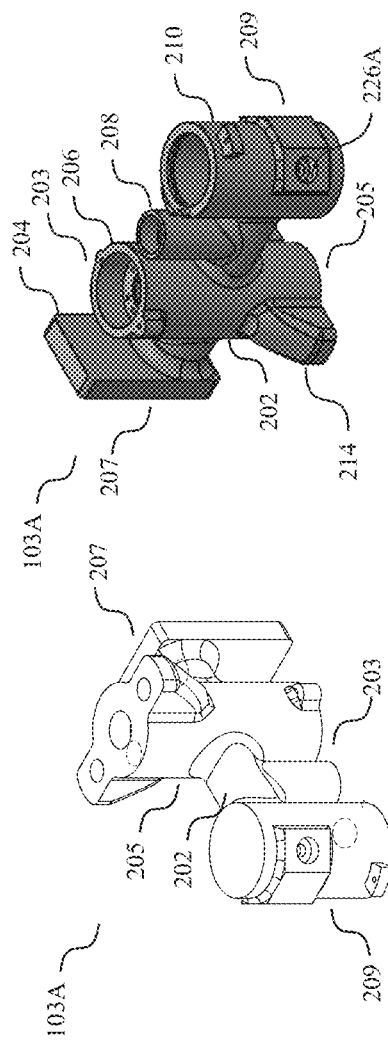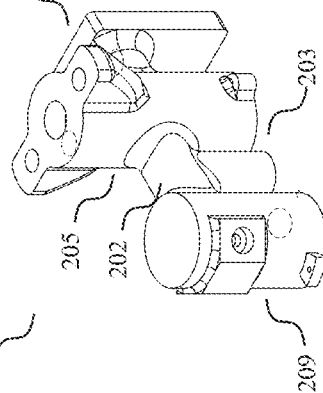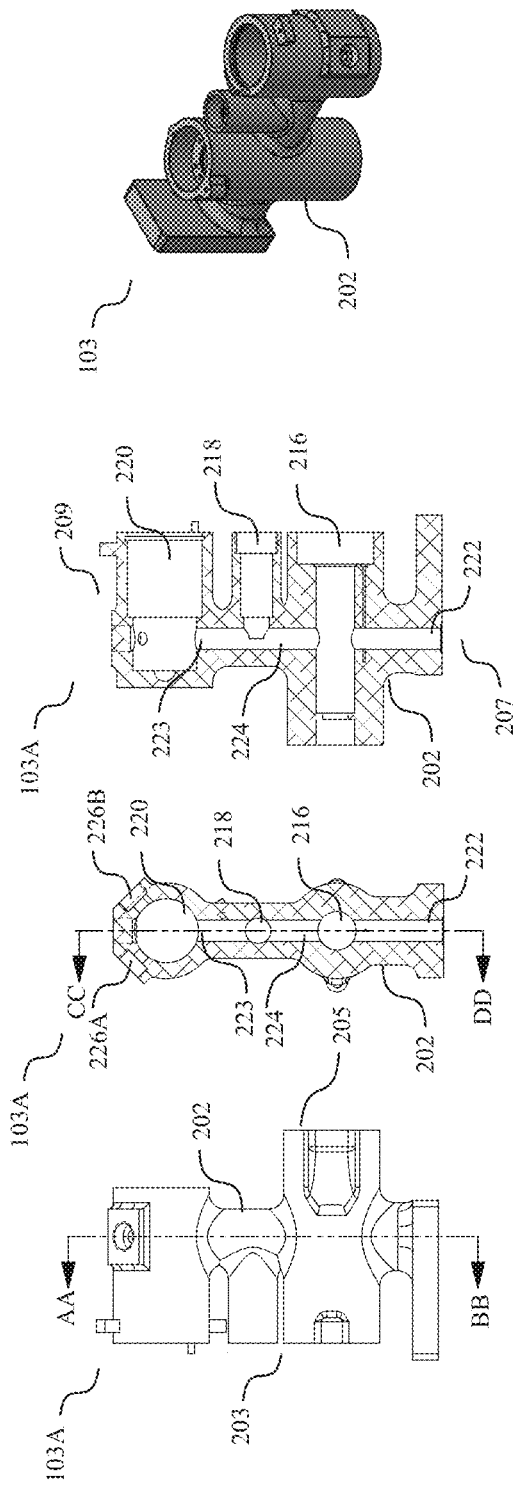

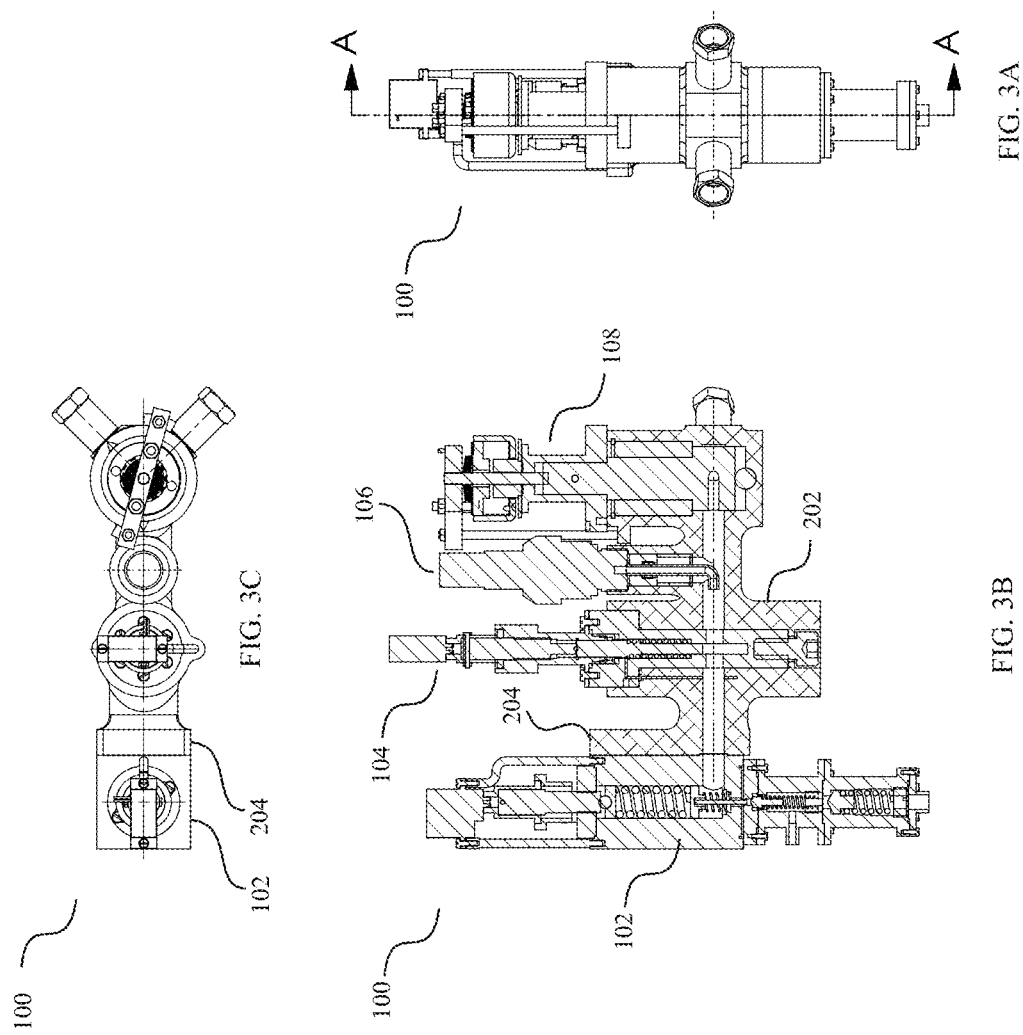

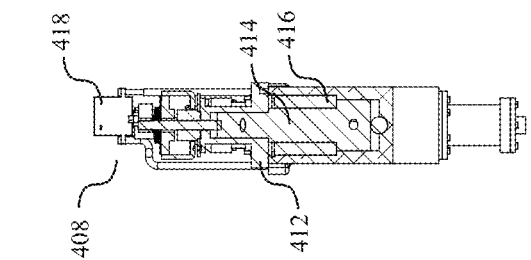
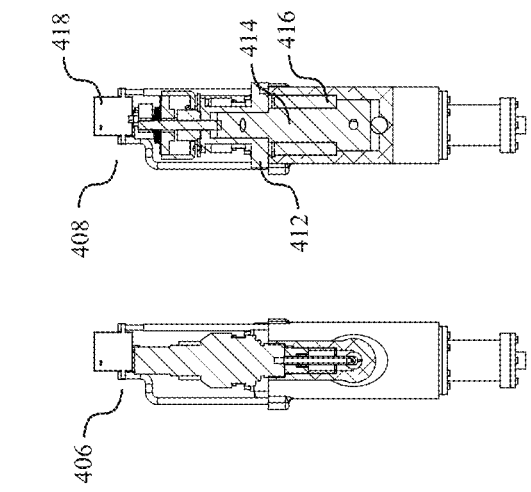
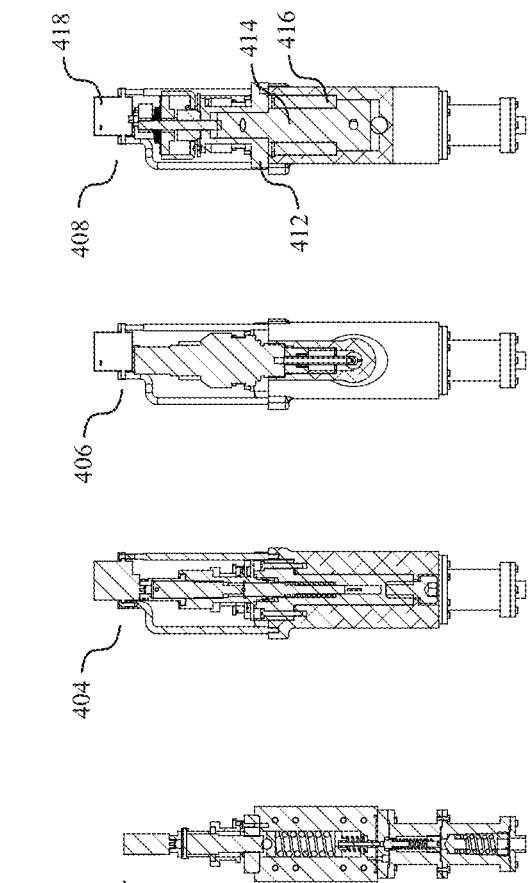
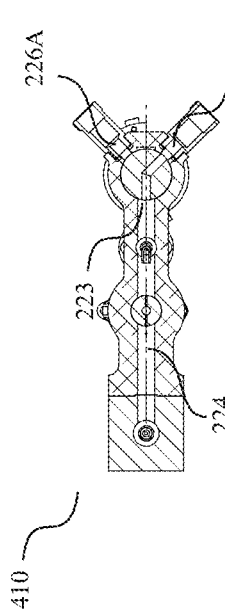
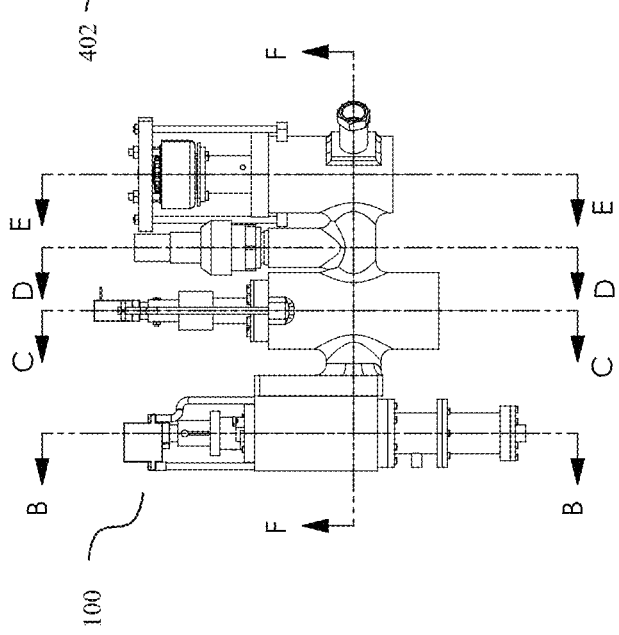

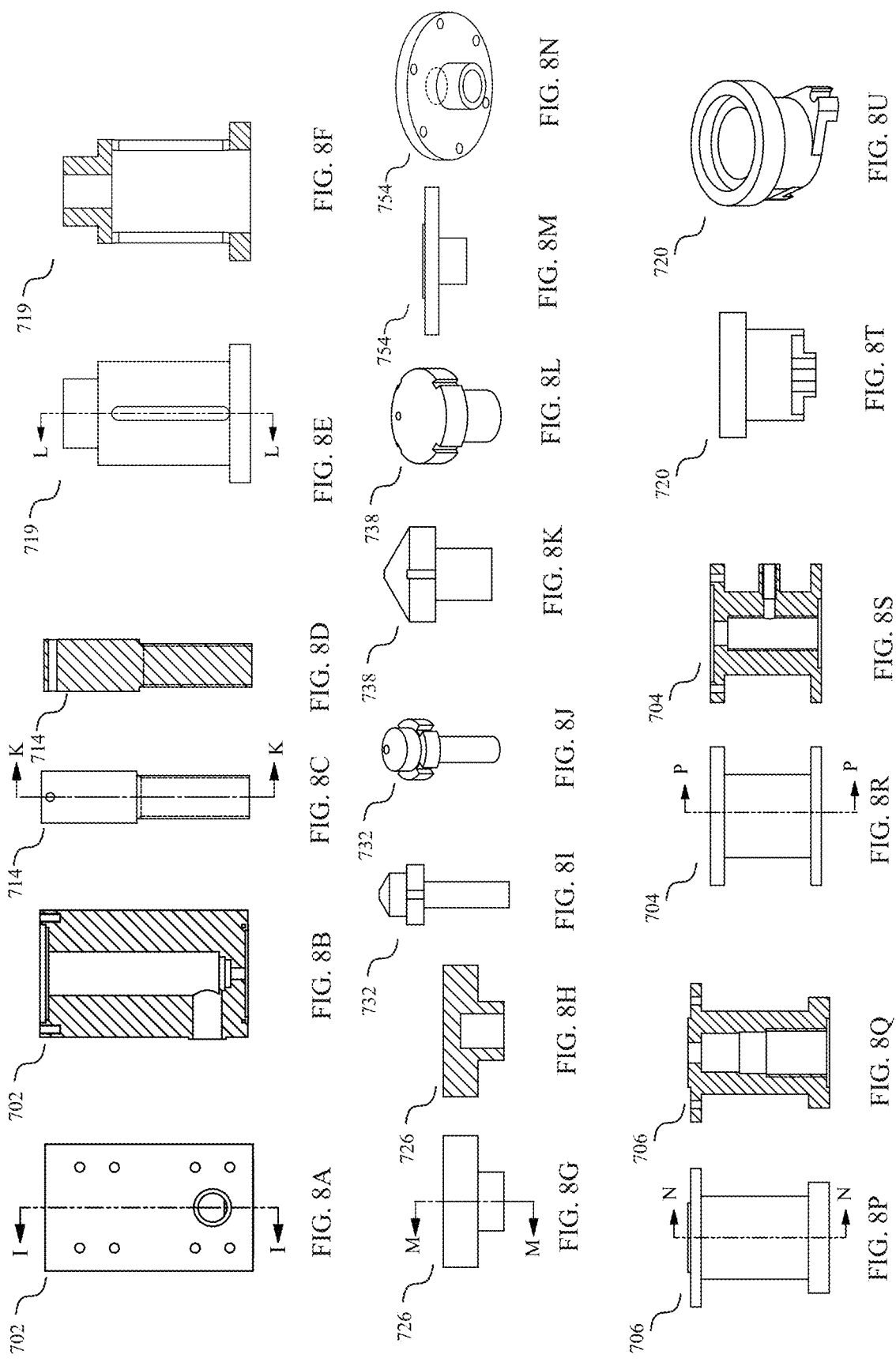

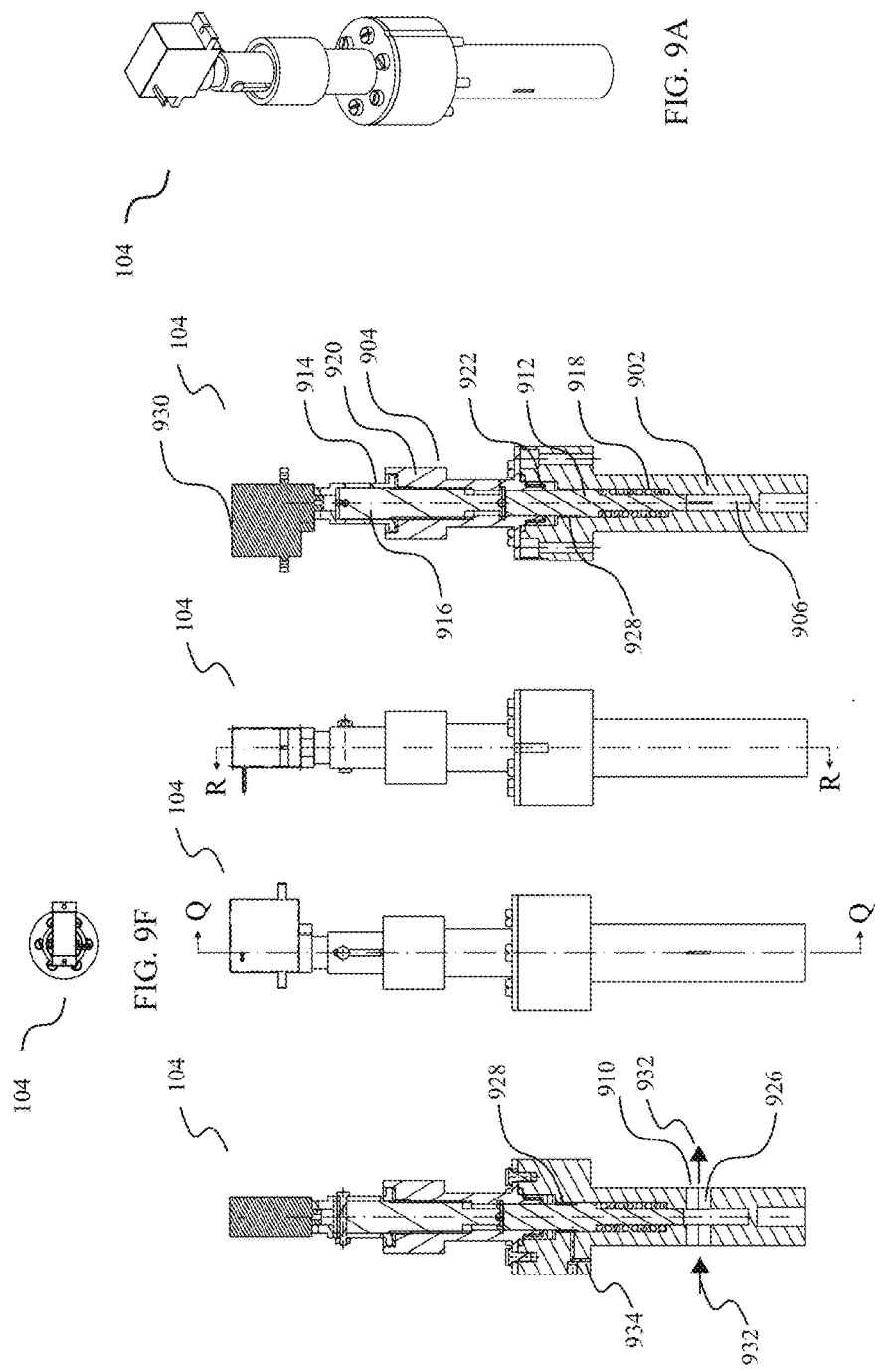

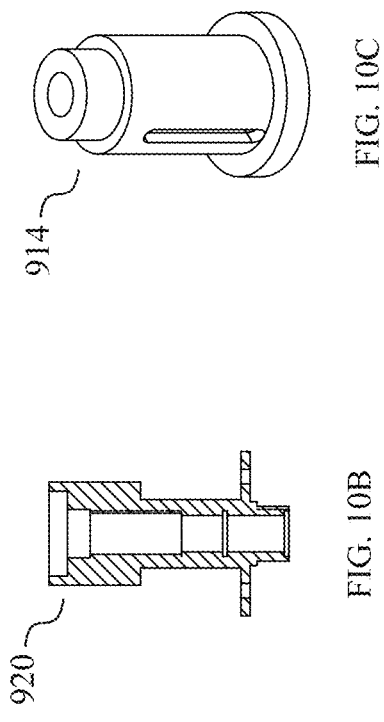
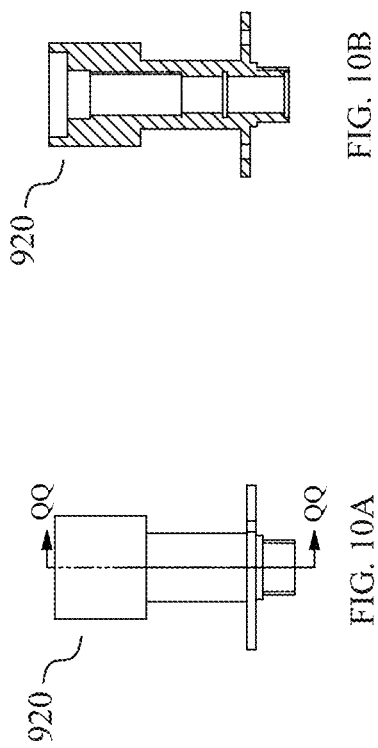
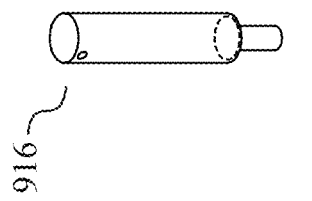
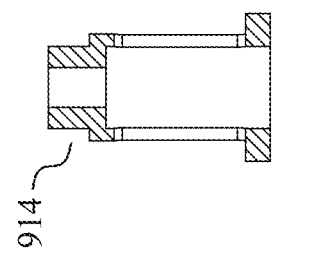
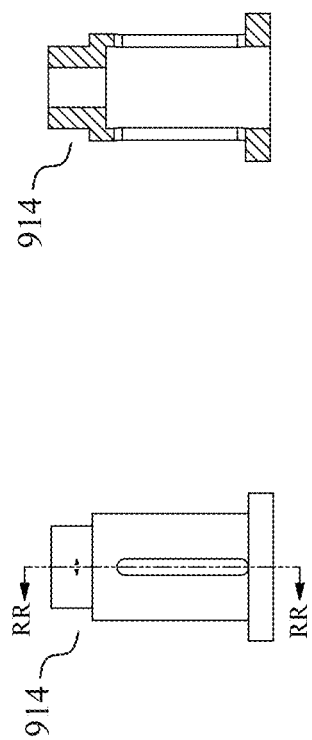

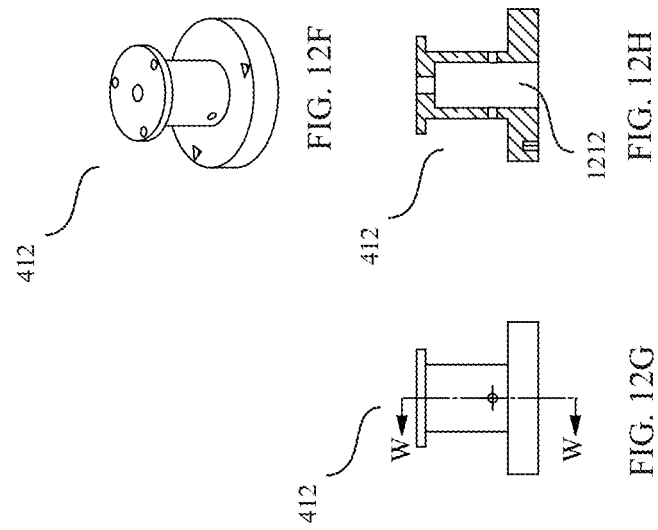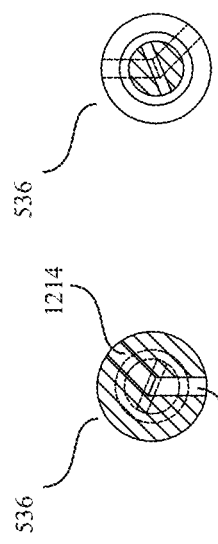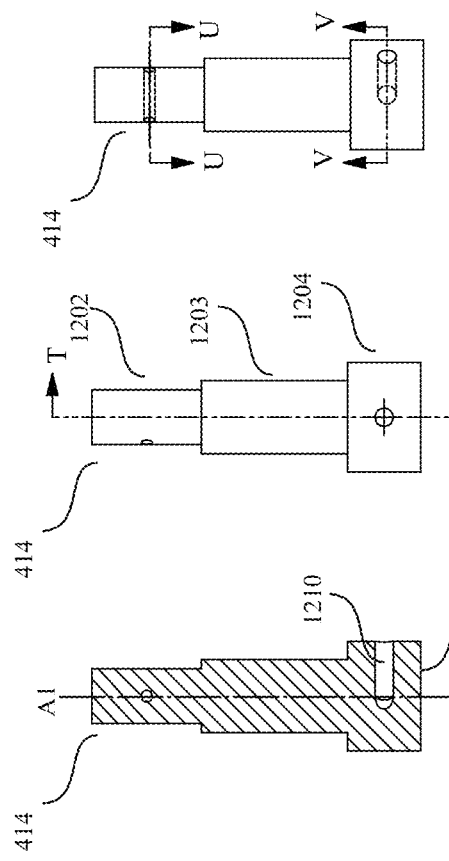

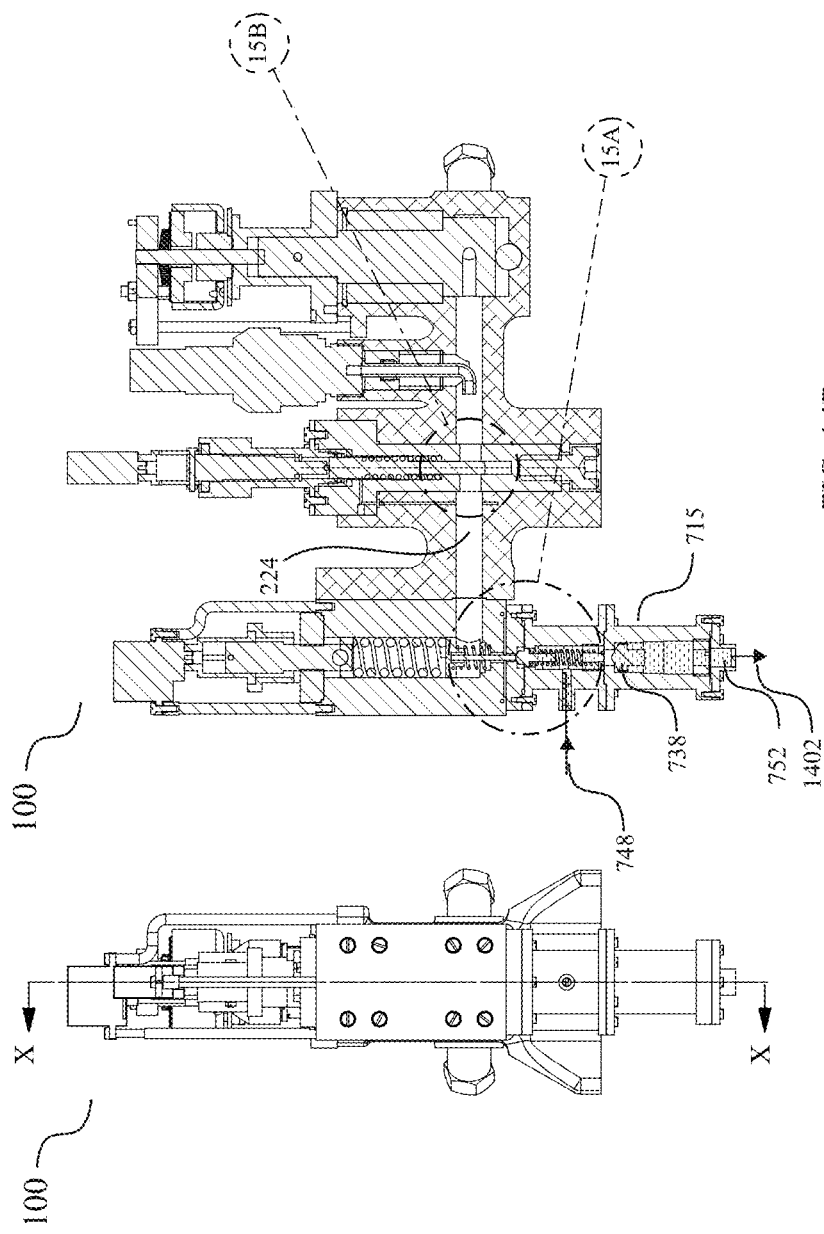

INTEGRATED VARIABLE PRESSURE AND FLOW REGULATOR

FIELD OF THE INVENTION

The present invention generally relates to systems and methods for regulating fluid pressure and flow rates. More particularly, the present invention relates to such systems and methods that allow for the integrated but independent control of both fluid pressure and fluid flow rates.

BACKGROUND OF THE INVENTION

In many applications it is often a requirement to control the pressure and flow rates of a fluid. But, with fluctuations in demand at the delivery side it is difficult to achieve a desired pressure and flow rate. A constant desired fluid pressure against a varying demand can be obtained by variable speed constant pressure pumps. However, the same pump alone cannot deliver fluid at different fluid flow rates.

Use of pressure regulators and flow controllers in hydraulic/fluid circuits may make it possible to get desired pressure and flow rate at delivery. The function of a pressure regulator is to deliver the flow of a fluid at a regulated pressure and to maintain that pressure at a set value independent of the flow. Pressure regulators are not designed to control flow rates. On the other hand, flow controllers are used to precisely measure and control the amount of the required fluid. Conventional flow controllers generally include a flow meter, a control valve, a valve actuator, and a controller. The flow meter measures the flow rate of the fluid in a flow path and provides a signal indicative of that flow rate.

Some other components commonly required in hydraulic/fluid systems are pressure relief valves and flow diverters. Relief valves are used to protect the pressurized system from building up pressures that exceed their maximum allowable working pressure or any pressures that the user specifies. Pressure relief valves are designed to limit the upstream pressure by opening at a preset value and discharging the fluid. Flow diverters are used for diverting the flow in a specific direction. No single unit fluid control mechanism exists in prior art which allows independent control over both fluid pressure and flow rate.

Presently, all of the aforementioned items are available in the market as individual units. A user can buy those separately and install in the hydraulic/fluid circuit in the required order. Obviously, individual installation of all such components in the hydraulic/fluid circuit requires considerable expertise, time and effort. The layout of the hydraulic/fluid circuit needs to be designed to accommodate each individual installation. Also, with each component being installed separately in the hydraulic line, the probability of leakage increases.

Thus, there exists a need for a system and method which overcome the above-mentioned drawbacks associated with conventional fluid management systems.

OBJECTS OF THE INVENTION

It is therefore, an object of the present invention to provide an integrated fluid control system and method.

Another object of the present invention is to provide a combined variable pressure and flow rate fluid control device.

A still further object of the present invention is to provide an easily installable fluid control system.

Yet another object of the present invention is to provide a compact fluid pressure and flow rate regulator.

Another object of the present invention is to provide a fluid control system that simplifies the piping design of a fluid circuit.

Yet another object of the present invention is to provide a fluid control system that is cost effective and saves space.

A still further object of the present invention is to provide an off-the-shelf fluid control system for installation in fluid circuits.

Yet another object of the invention is to provide a fluid control device of a simple and practical nature that will serve to efficiently deliver desired flow rate at required pressure.

A still further object of the present invention is to provide a fluid control device that gives dependable operation with a high degree of reliability.

Yet another object of the present invention is to provide a fluid pressure and flow rate control device having integral safety feature.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a fluid control device which allows for the integrated but yet independent control of fluid pressure and flow rates. The disclosed invention is an easily installable fluid control system that simplifies fluid circuit piping design for reduced maintenance and leakage when compared to conventional fluids management methods. The device comprises a pressure regulator, a flow control valve, a flow meter and a flow diverter, all of which are housed in a single manifold unit.

The manifold body of the integrated variable pressure and flow regulator of the present invention comprises a coupling face with a manifold inlet disposed at a proximal end of the manifold body, a flow control valve cavity which operably receives the pressure control valve, a flow meter cavity which houses the flow meter and a flow diverter cavity with outlet ports disposed at the distal end of the manifold body which rotatably receives the flow diverter. A central fluid transfer passageway defined within the manifold body puts the manifold inlet in fluid communication with the manifold outlet ports through the flow control valve cavity, flow meter cavity and flow diverter cavity.

The pressure regulator includes a pressure regulator housing body, a reducer pressure setting assembly and a high pressure valve assembly. A desired fluid pressure, referred to as reducer pressure setting hereinafter, can be set in the pressure regulator to bring down an inlet fluid pressure of a fluid flow received from a source to a lower outlet fluid pressure. The pressure regulator of the present invention is a closed-loop device. The reducer pressure setting assembly of the pressure regulator senses the downstream pressure and interaction of the reducer pressure setting assembly with the high pressure valve assembly automatically adjusts position of a high pressure valve to maintain the outlet fluid pressure at said reducer pressure setting. When the output of the regulator senses that the pressure has dropped below a predetermined point, the regulator opens and allows more fluid through. The opposite happens when the downstream pressure increases. In case of an increase in upstream fluid pressure in excess of a predefined value, an in-built relief valve lets the excess fluid get released without damaging the system.

The flow control valve comprises a flow control valve housing and a flow control valve assembly. The flow control valve housing defines an orifice which aligns with the central fluid transfer passageway of the manifold body. A flow control valve spool of the flow control valve assembly coacts with the orifice to provide a variable effective orifice opening to ensure a predetermined substantially constant output fluid flow rate. Any change in fluid pressure in the central fluid transfer passageway causes a corresponding change in fluid pressure inside an annular space defined by the flow control valve spool and the flow control valve housing. Responsive to this change in fluid pressure inside the annular space the flow control valve spool increases or decreases the orifice opening to adjust the fluid flow to the required outlet fluid flow rate.

The flow meter includes a pitot tube with its pitot tube orifice placed in the central fluid transfer passageway and its other end operatively connected to a pressure transducer. The flow meter generates an output signal proportionate to the flow rate of the fluid flowing in the central fluid transfer passageway.

Finally, the flow diverter enables diversion of the fluid leaving the integrated variable pressure and flow regulator through any of the outlet ports so that the fluid flows in a desired direction.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention. The present invention will become more fully understood from the detailed description given herein below and the accompanying drawings which are given by way of illustration only, and thus are not limitative of the present invention, and wherein:

FIG. 2A illustrates an outer appearance perspective view of a first embodiment of the manifold of the integrated variable pressure and flow regulator of the present invention;

FIG. 2B illustrates an outer appearance perspective view of a second embodiment of the manifold of the integrated variable pressure and flow regulator of the present invention;

FIG. 2C illustrates an outer appearance perspective view of the first embodiment of the manifold of the integrated variable pressure and flow regulator of the present invention in inverted position;

FIG. 2D illustrates a side view of the manifold of the integrated variable pressure and flow regulator of the present invention;

FIG. 2E illustrates a cross-sectional view of the manifold of the integrated variable pressure and flow regulator of the present invention taken along line AA-BB of FIG. 2D;

FIG. 2F illustrates a cross-sectional view of the manifold of the integrated variable pressure and flow regulator of the present invention taken along line CC-DD of FIG. 2E;

FIG. 3A illustrates a right-hand side view of the integrated variable pressure and flow regulator of the present invention;

FIG. 3B is a cross-sectional view of the integrated variable pressure and flow regulator of the present invention taken along line A-A of FIG. 3A;

FIG. 3C illustrates a top view of the integrated variable pressure and flow regulator of the present invention;

FIG. 4A is a front elevation view of the integrated variable pressure and flow regulator of the present invention;

FIG. 4B is a cross-sectional view of the integrated variable pressure and flow regulator of the present invention taken along line B-B of FIG. 4A;

FIG. 4C is a cross-sectional view of the integrated variable pressure and flow regulator of the present invention taken along line C-C of FIG. 4A;

FIG. 4D is a cross-sectional view of the integrated variable pressure and flow regulator of the present invention taken along line D-D of FIG. 4A;

FIG. 4E is a cross-sectional view of the integrated variable pressure and flow regulator of the present invention taken along line E-E of FIG. 4A;

FIG. 4F is a cross-sectional view of the integrated variable pressure and flow regulator of the present invention taken along line F-F of FIG. 4A;

FIG. 8A is a front elevation view of the reducer housing of the pressure regulator of the integrated variable pressure and flow regulator;

FIG. 8B is a cross-sectional view of the reducer housing taken along line I-I of FIG. 8A;

FIG. 8C is a front elevation view of the pressure adjusting screw of the pressure regulator of the integrated variable pressure and flow regulator;

FIG. 8D is a cross-sectional view of the pressure adjusting screw taken along line K-K of FIG. 8C;

FIG. 8E is a front elevation view of the pressure adjuster coupling of the pressure regulator of the integrated variable pressure and flow regulator;

FIG. 8F is a cross-sectional view of the pressure adjuster coupling taken along line L-L of FIG. 8E;

FIG. 8G is a front elevation view of the reducer valve piston of the pressure regulator of the integrated variable pressure and flow regulator;

FIG. 8H is a cross-sectional view of the reducer valve piston taken along line M-M of FIG. 8G;

FIG. 8I is a front elevation view of the high pressure valve of the pressure regulator of the integrated variable pressure and flow regulator;

FIG. 8J is a perspective view of the high pressure valve of the pressure regulator of the integrated variable pressure and flow regulator;

FIG. 8K is a front elevation view of the relief valve of the pressure regulator of the integrated variable pressure and flow regulator;

FIG. 8L is a perspective view of the relief valve of the pressure regulator of the integrated variable pressure and flow regulator;

FIG. 8M is a front elevation view of the relief valve plate of the pressure regulator of the integrated variable pressure and flow regulator;

FIG. 8N is a perspective view of the relief valve plate of the pressure regulator of the integrated variable pressure and flow regulator;

FIG. 8P is a front elevation view of the relief valve housing of the pressure regulator of the integrated variable pressure and flow regulator;

FIG. 8Q is a cross-sectional view of the relief valve housing taken along line N-N of FIG. 8P;

FIG. 8R is a front elevation view of the reducer inlet housing of the pressure regulator of the integrated variable pressure and flow regulator;

FIG. 8S is a cross-sectional view of the reducer inlet housing taken along line P-P of FIG. 8R;

FIG. 8T is a front elevation view of the thrust plate housing of the pressure regulator of the integrated variable pressure and flow regulator;

FIG. 8U is a perspective view of the thrust plate housing of the pressure regulator of the integrated variable pressure and flow regulator;

FIG. 9A illustrates perspective view of the flow control valve of the integrated variable pressure and flow regulator of the present invention;

FIG. 9B illustrates front elevation view of the flow control valve of the integrated variable pressure and flow regulator of the present invention;

FIG. 9C is a cross-sectional view of the flow control valve of the integrated variable pressure and flow regulator of the present invention taken along line Q-Q of FIG. 9B;

FIG. 9D illustrates another front elevation view of the flow control valve of the integrated variable pressure and flow regulator of the present invention;

FIG. 9E is a cross-sectional view of the flow control valve of the integrated variable pressure and flow regulator of the present invention taken along line R-R of FIG. 9D;

FIG. 9F illustrates a top view of the flow control valve of the integrated variable pressure and flow regulator of the present invention;

FIG. 9G illustrates a bottom view of the flow control valve of the integrated variable pressure and flow regulator of the present invention;

FIG. 10A illustrates cap nut of the flow control valve of the integrated variable pressure and flow regulator of the present invention;

FIG. 10B is a cross-sectional view of the cap nut of the flow control valve of the integrated variable pressure and flow regulator of the present invention taken along line QQ-QQ of FIG. 10A;

FIG. 10C illustrates a perspective view of the flow adjusting screw of the flow control valve of the integrated variable pressure and flow regulator of the present invention;

FIG. 10D illustrates a front elevation view of the flow adjusting screw of the flow control valve of the integrated variable pressure and flow regulator of the present invention;

FIG. 10E is a cross-sectional view of the flow adjusting screw of the flow control valve of the integrated variable pressure and flow regulator of the present invention taken along line RR-RR of FIG. 10D;

FIG. 10F illustrates a perspective view of the pusher screw of the flow control valve of the integrated variable pressure and flow regulator of the present invention;

FIG. 12A illustrates front elevation view of a diverter valve of the flow diverter of the integrated variable pressure and flow regulator of the present invention;

FIG. 12B is a cross-sectional view of the diverter valve of the flow diverter of the present invention taken along line T-T of FIG. 12A;

FIG. 12C illustrates another front elevation view of a diverter valve of the flow diverter of the integrated variable pressure and flow regulator of the present invention;

FIG. 12D is a cross-sectional view of the diverter valve of the flow diverter of the present invention taken along line V-V of FIG. 12C;

FIG. 12E is a cross-sectional view of the diverter valve of the flow diverter of the present invention taken along line U-U of FIG. 12C;

FIG. 12F illustrates a perspective view of the flow lever diverter knob of the flow diverter of the integrated variable pressure and flow regulator of the present invention;

FIG. 12G illustrates front elevation view of the flow lever diverter knob of the flow diverter;

FIG. 12H is a cross-sectional view of the flow lever diverter knob of the flow diverter taken along line W-W of FIG. 12G;

FIG. 14A is a left side elevation view of the integrated variable pressure and flow regulator of the present invention in closed position;

FIG. 14B is a cross-sectional view of the integrated variable pressure and flow regulator of the present invention of FIG. 14A taken along line X-X thereof;

Figure 1:
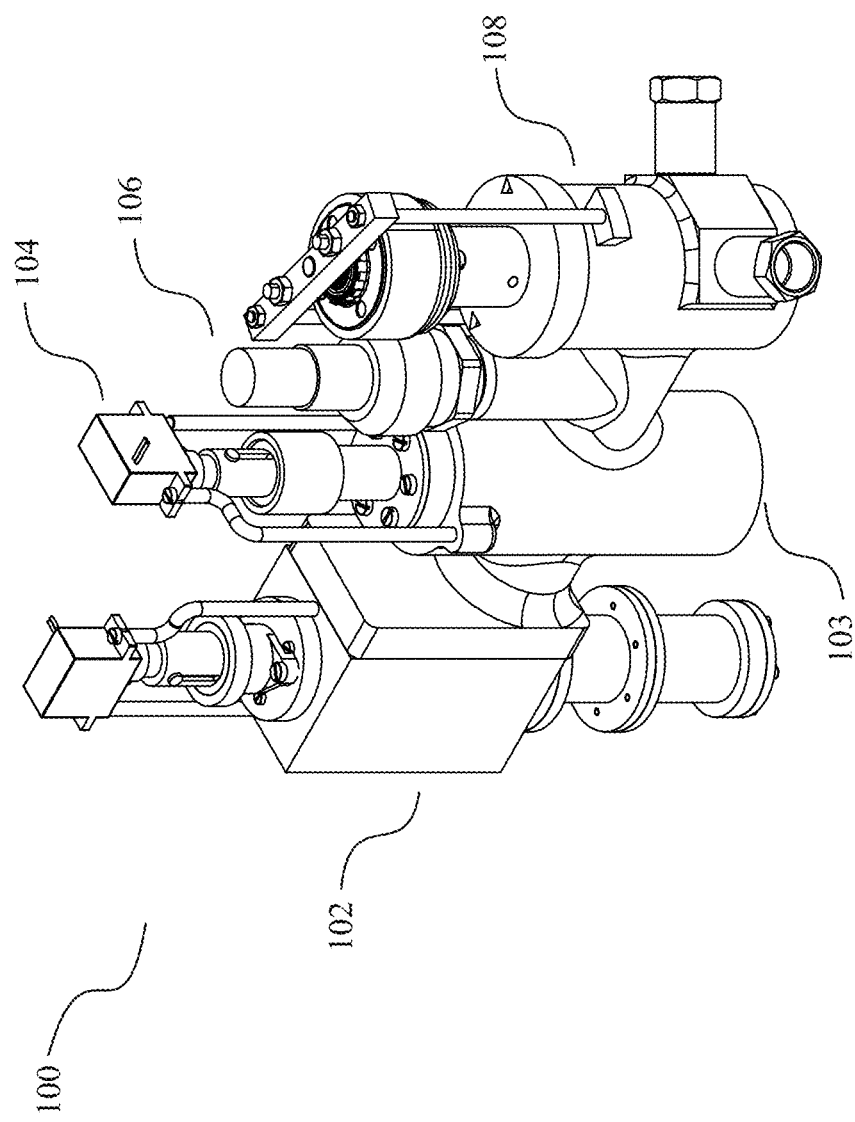
FIG. 1 is an outer appearance perspective view illustrating an integrated variable pressure and flow regulator in accordance with an embodiment of the present invention.

The present invention will now be described with reference to the accompanying drawings.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Reference to FIG. 1, the integrated variable pressure and flow regulator 100 of the present invention comprises a pressure regulator 102, a manifold 103, a flow control valve 104, a flow measuring unit/flow meter 106 and a flow diverter 108. Turning to FIGS. 2A-2F, at the heart of the integrated variable pressure and flow regulator 100 is the manifold 103 (or the second embodiment of the manifold 103A) having a manifold body 202, a manifold top side 203, a manifold bottom side 205, a manifold proximal end 207 and a manifold distal end 209. The only difference between the embodiments of the manifolds 103A and 103 shown in FIGS. 2A and 2B respectively is the mounting provision 214 disposed on the main body 202 of the embodiment of FIG. 2A to facilitate installation of the manifold in the fluid circuit.

Reference to FIG. 2A, the manifold body 202 defines a coupling face 204 disposed on the proximal end 207, a flow control valve cavity wall 206 disposed next to the coupling face 204, a flow diverter valve cavity wall 210 disposed at the distal end 209 and a flow meter cavity wall 208 disposed there between. The flow control valve cavity wall 206 defines a flow control valve cavity 216. Similarly, the flow meter cavity wall 208 defines a flow meter cavity 218 and the flow diverter valve cavity wall 210 defines a flow diverter cavity 220. All the cavities 216, 218 and 220 open outwardly on the manifold top side 203. A manifold inlet port 222 (refer FIGS. 2E and 2F) connected to the pressure control valve cavity 216 is disposed at the coupling face 204 and one or more manifold outlet ports 226 (refer FIGS. 2A and 2E) connected to the flow diverter cavity 220 are disposed at the flow diverter valve cavity wall 210 at the distal end 209. A central fluid transfer passageway 224 defined within the manifold body 202 puts the manifold inlet 222, manifold outlet ports 226 (first manifold outlet port 226A and second manifold outlet port 226 B, for example) and the cavities 216, 218 and 220 in fluidic communication with at least one another. While each of the cavities 216, 218 and 220 are shown on the same side of the manifold body 202 in the figures, it will be appreciated that the cavities may be placed at other suitable locations on the manifold body 202. Other suitable locations will occur to one of ordinary skill in the art. Each of the cavities 216, 218, 220 and the ports 222, 226 may be made threaded for receiving valves and suitable tubing or piping respectively, which are in turn connected to a desired source or destination.

As discussed above, the manifold 103 is configured to receive the pressure regulator 102, flow control valve 104, flow measuring unit 106 and flow diverter 108. Reference to FIGS. 3B, 3C, 4A-4F and 5, the pressure regulator 102 can be attached to the coupling face 204 of the manifold body 202 by means of fasteners 508. The flow meter cavity 216 is adapted to receive the flow control valve 104 of the present invention. The flow control valve 104 can be secured within the cavity 216 by screw fasteners 520. The flow meter 106 is similarly secured to the flow meter cavity 218. The flow diverter cavity 220 is configured to rotationally receive the flow diverter valve 108. FIG. 4B illustrates cross-sectional view 402 of the pressure regulator 102 taken along the line B-B of FIG. 4A. FIGS. 4C, 4D and 4E illustrate the cross-sectional views 404, 406 and 408 of the flow control valve 104, flow meter 106 and flow diverter valve 108 respectively along with the relevant sections of the manifold body 202, after being attached to the manifold 103. FIG. 4F shows the cross-sectional view 410 taken along the line F-F of FIG. 4A wherein line F-F runs through the central fluid transfer passageway 224.

The pressure regulator 102 of the present invention, also being referred to hereinafter as pressure reducing valve (PRV), is a servo control motor actuated pressure control valve that reduces higher upstream pressure to lower constant downstream pressure regardless of the fluctuating demand or the varying upstream force. Essentially, the valve maintains a steady desired pressure for the remaining fluid circuitry on its outlet.

Reference to FIGS. 5, 6A-6H, 7 and 8A-8U, the pressure regulator 102 comprises a pressure regulator main body 701, a reducer pressure setting assembly 711, a high pressure valve assembly 713 and, optionally, a pressure relief valve section 715 and a remote reducer control mechanism 716. The pressure regulator main body 701 further comprises a reducer housing 702, a reducer inlet housing 704 and a relief valve housing 706.

Figure 5:
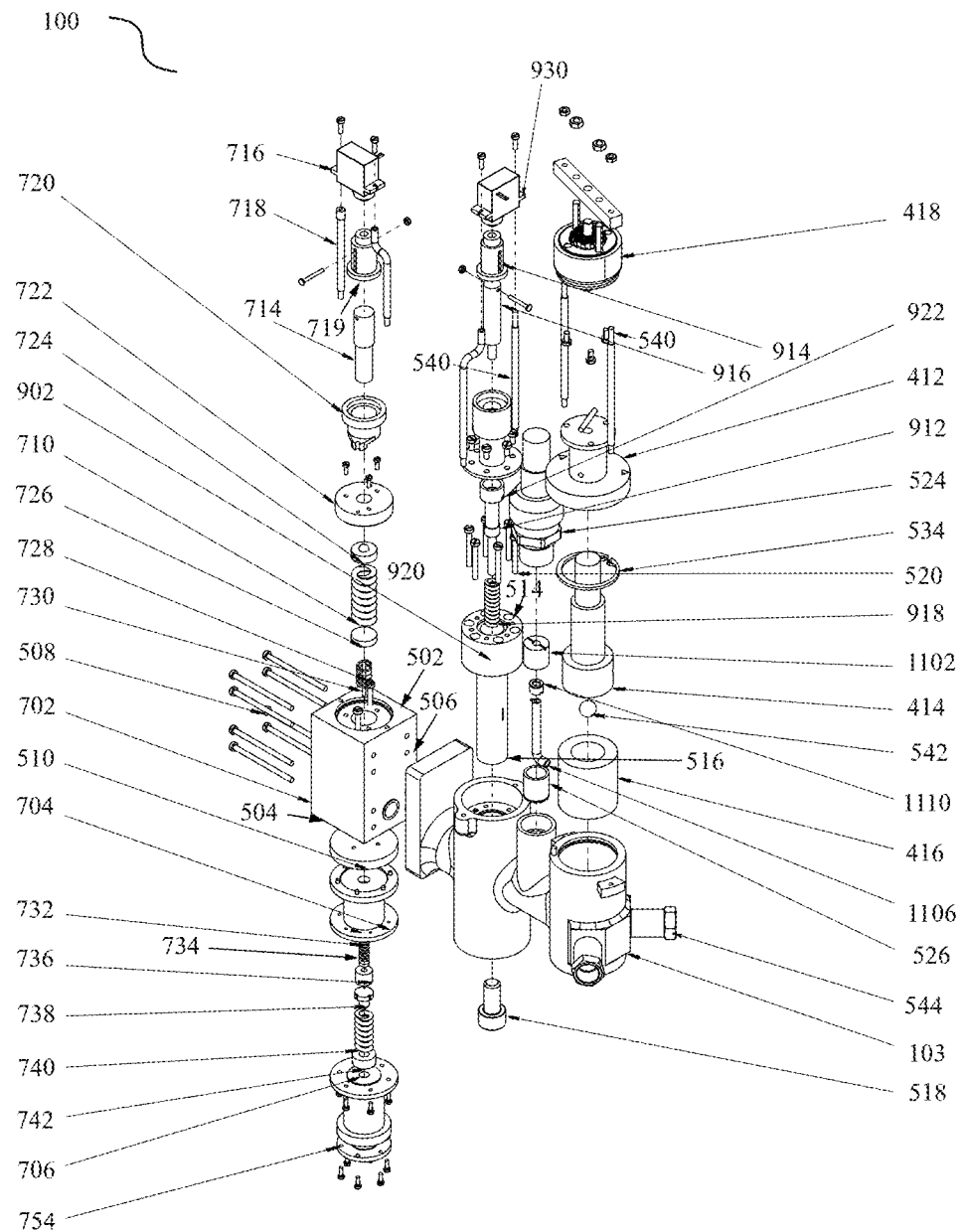
FIG. 5 is an exploded view of the integrated variable pressure and flow regulator of the present invention.
Figure 6:
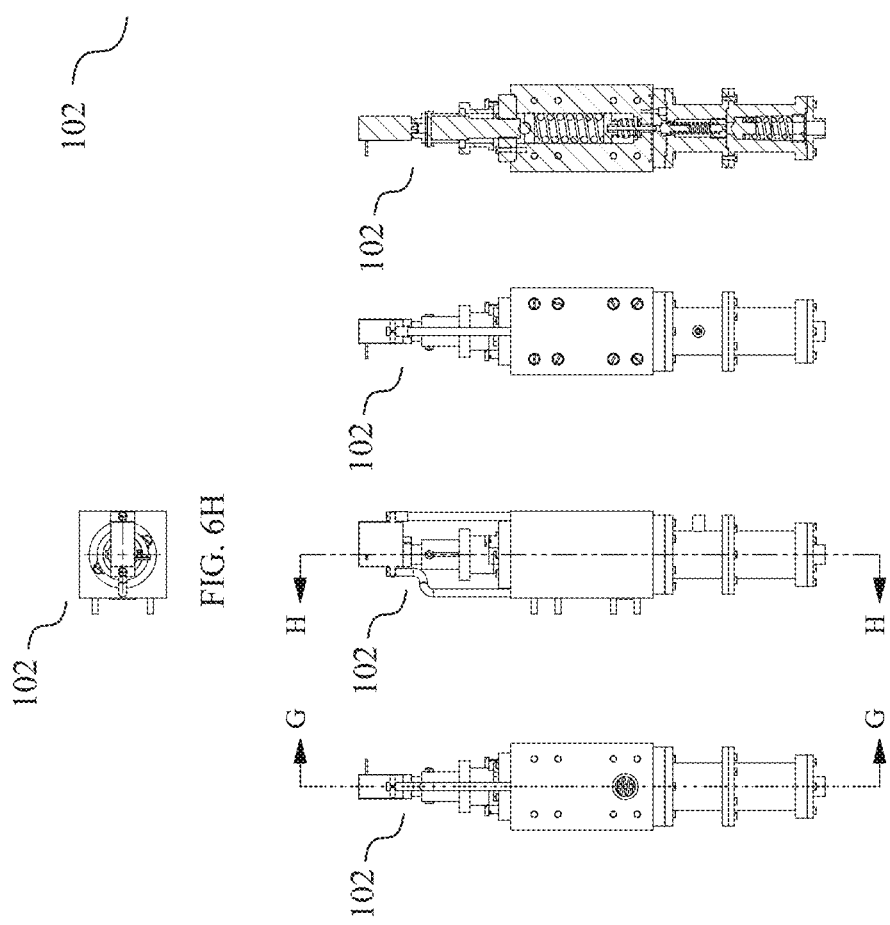
FIG. 6A and 6B illustrate perspective views of the pressure regulator of the integrated variable pressure and flow regulator of the present invention.
FIGS. 6C-6E are different side views of the pressure regulator of the integrated variable pressure and flow regulator of the present invention.
FIG. 6G is a cross-sectional view of the pressure regulator of the integrated variable pressure and flow regulator of the present invention taken along line H-H of FIG. 6D.
FIG. 6H is a plan view of the pressure regulator of the integrated variable pressure and flow regulator.
Figure 7:
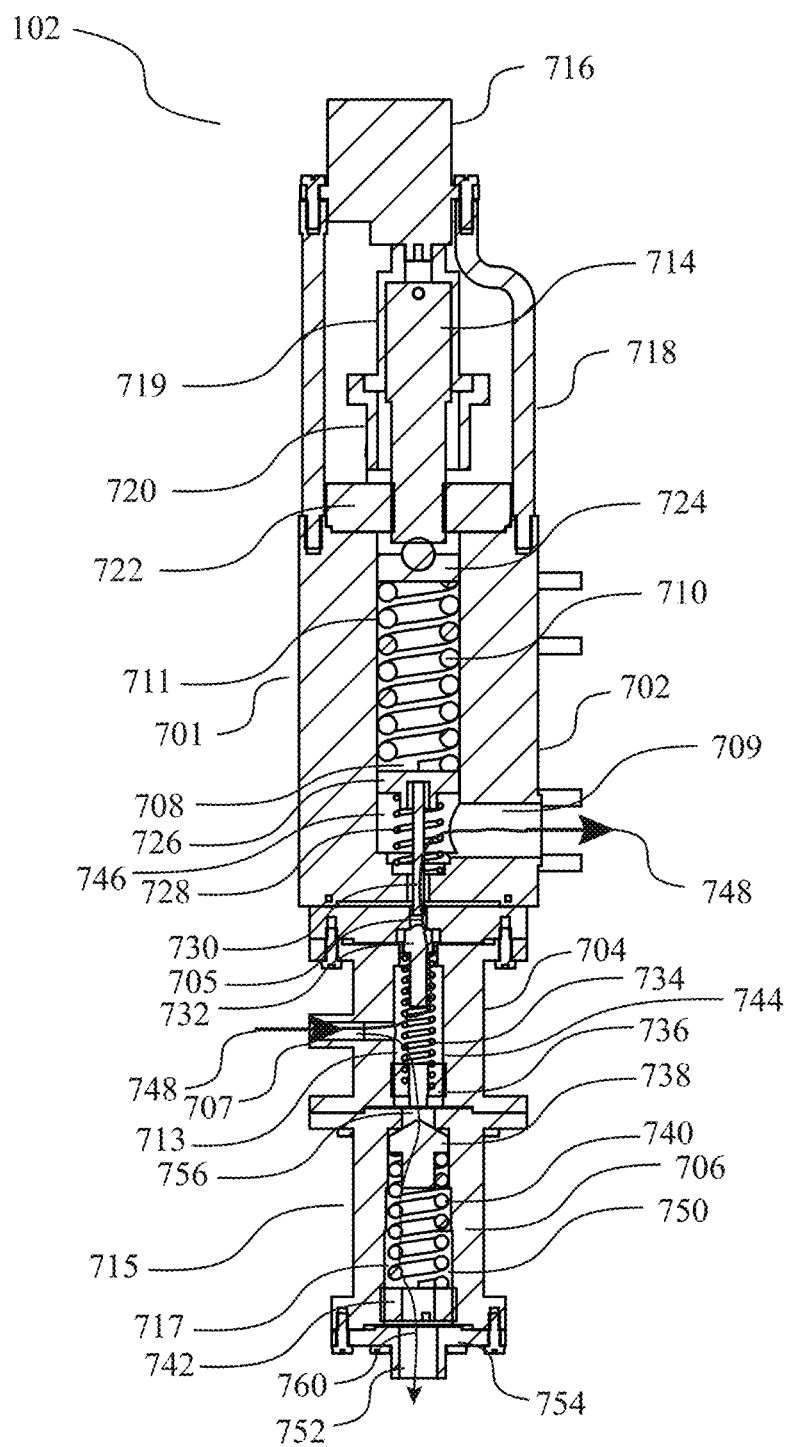
FIG. 7 is a cross-sectional view of the pressure regulator of the integrated variable pressure and flow regulator of the present invention taken along line G-G of FIG. 6C.
Figure 11A:
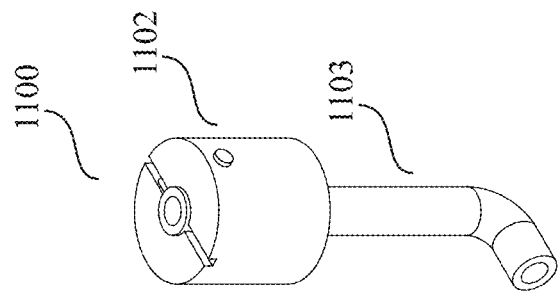
FIG. 11A illustrates perspective views of a pitot tube of the integrated variable pressure and flow regulator of the present invention.
Figures 11B, 11D:
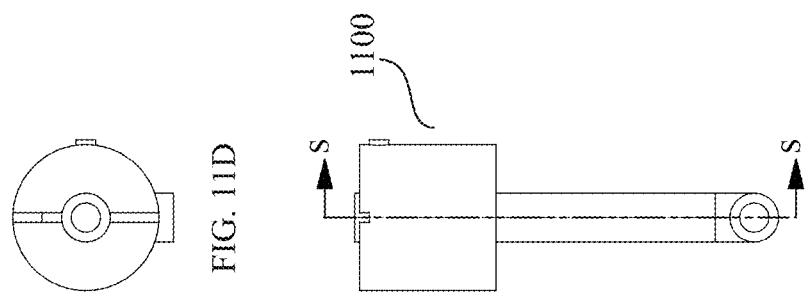
FIG. 11B illustrates front elevation view of the pitot tube of the integrated variable pressure and flow regulator of the present invention.
FIG. 11D is a top view of the pitot tube of the integrated variable pressure and flow regulator of the present invention.
Figure 11C:
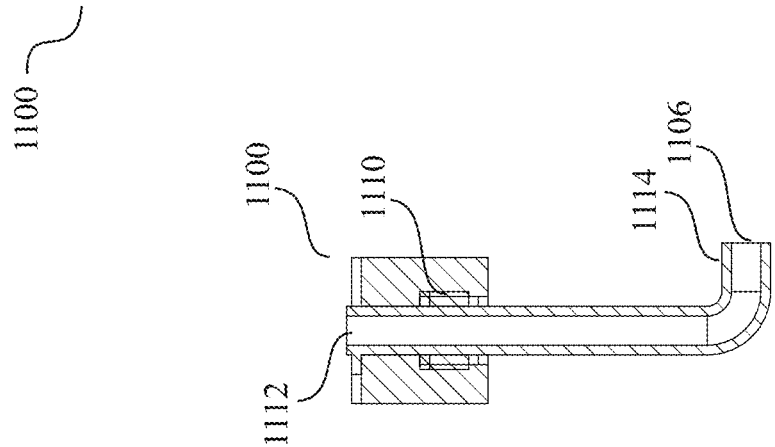
FIG. 11C is a cross-sectional view of the pitot tube of the integrated variable pressure and flow regulator of the present invention taken along line S-S of FIG. 11B.

The reducer housing 702 houses the reducer pressure setting assembly 711 as illustrated in FIGS. 5 and 7. Reducer housing 702, also shown in FIGS. 8A and 8B, comprises an internal reducer housing chamber 708 which opens at the reducer housing top 502 of FIG. 5 to receive the reducer pressure setting assembly 711. The reducer housing chamber 708 also opens at the reducer housing face 506 shown in FIG. 5 to form reducer outlet 709 and at the bottom face 504 of FIG. 5 to form pressure reducer fluid passage 705. The reducer housing face 506 is made compatible for attaching to manifold coupling face 204. On tightening of the fasteners 508 the reducer housing 702 (with a sealing ring interposed there between) compressively engage with the coupling face to effect a sealing against any leakage of the fluid flowing through the reducer outlet 709 which lies aligned with the manifold inlet 222.

The reducer pressure setting assembly 711, as illustrated in FIGS. 5 and 7, comprises a pressure adjusting screw 714, a pressure adjusting spring 710, a reducer valve piston 726, a pusher rod 730 and a retainer spring 728. The remote reducer control mechanism 716 (a servo control motor, for example) is secured to the reducer housing 702 by means of studs 718. The pressure adjusting screw 714 is supported by a thrust plate housing 720 (shown in FIGS. 8T and 8U). The upper end of the pressure adjusting screw 714 is affixed to the remote reducer control mechanism 716 through pressure adjuster coupling 719 (shown separately in FIGS. 8E and 8F) while its lower end rotatably sits atop an adjuster spring center 724 supported by a reducer housing cap 722. The pressure adjusting spring 710 is placed under compression within the reducer housing chamber 708 between the adjuster spring center 724 and a reducer valve piston 726 (shown in FIGS. 8G and 8H) and applies a first control force in a first direction to the reducer valve piston 726 which is linearly movable inside the reducer housing chamber 708. The retainer spring 728 placed below the reducer valve piston 726 and along the pusher rod 730 applies a second control force on the reducer valve piston 726 opposite to the first control force in a second direction opposite to the first direction. The pressure adjusting spring 710 biases the pusher rod 730 toward a first direction with a first control force, as per the reducer pressure setting to enable the pusher rod 730 to make a force transmitting communication with said high pressure valve 732 through said pressure reducer fluid passage 705.

The compression of the pressure adjusting spring 710 and, thus, the first control force on the reducer piston valve 726 and consequently on the pusher rod 730, can be adjusted by movement of the pressure adjusting screw 714, also shown in FIGS. 8C and 8D, relative to the reducer housing 702 which can be actuated by the servo control motor 716 or manually.

The reducer inlet housing 704, shown in FIGS. 8R and 8S, forms a high pressure valve housing chamber 744 which comprises a reducer inlet 707 as illustrated in FIGS. 5 and 7. On being coupled to the reducer housing bottom face 504 with a valve plate 510 shown in FIG. 5 in between, the reducer inlet housing 704 enables formation of a reducer fluid path 748 which extends between the reducer inlet 707 and reducer outlet 709 via a pressure reducing fluid passage 705 disposed in the valve plate 510 for the flow of fluid therethrough in the direction referenced by arrows 748.

Reference to FIGS. 5 and 7, the high pressure valve assembly 713 is housed inside the high pressure valve housing chamber 744 and comprises a high pressure valve 732 (also shown in FIGS. 8I and 8J) operably coupled to a high pressure valve spring 734. The high pressure valve 732 is so designed that it can completely close the pressure reducing fluid passage 705 thereby closing the reducer fluid path 748 when the high pressure valve abuts the valve plate 510. The high pressure valve spring 734 is mounted on a high pressure arrest nut 736 and biases a third control force on the high pressure valve 732 in a second direction opposite to the first control force exerted by the pressure adjusting spring 710 on the pusher rod 730.

As illustrated in FIGS. 5 and 7, the relief valve housing 706 (also shown in FIGS. 8P and 8Q) is coupled to the reducer inlet housing 704 and, if required, a relief fluid path indicated by reference numeral 760 can be established starting from the high pressure valve housing chamber 744 through a relief valve nut 742 to a relief valve exit 752 disposed on a relief valve plate 754 (also shown in FIGS. 8M and 8N) attached to the relief valve housing 706.

The pressure relief valve section 715 comprises a pressure relief valve assembly 717 housed inside the relief valve housing chamber 750 and comprises a relief valve 738 and a relief valve spring 740. As illustrated in FIGS. 5 and 7, the relief valve spring 740 is disposed in abutting, force-transmitting contact with the relief valve 738 (also shown in FIGS. 8K and 8L) and is retained by a relief valve nut 742 at the opposite end. The relief valve spring provides a biasing fourth control force for urging the relief valve 738 toward its first position such that the relief valve aperture 756 remains closed within a relief set pressure of the fluid in absence of an opposing force greater than the fourth control force.

The flow control valve 104 of the present invention controls the volumetric rate of the fluid that flows through it. It is done by changing the size of the orifice through which the fluid is made to pass. In many instances, the process demand fluctuates and, to meet such variable demands, the fluid flow is required to be controlled. The flow control valve 104 of the present invention achieves such variable flow rate control with the help of feedback received from the flow meter 106 in a closed loop set-up.

Reference to FIGS. 5, 9A-9G and 10A-10F the flow control valve 104 comprises a flow control valve housing 902 and a flow control valve assembly 904. The flow control valve housing 902 is provided with an elongated flow control valve housing chamber 906 which is open at the flow control valve housing top 514. An orifice 926 of substantially rectangular shape is disposed on the flow control valve housing 902 to transversely intersect the flow control valve housing chamber 906. The elongated flow control valve housing chamber 906 extends beyond the lateral limits of the orifice 926. Reference to FIG. 3B, 4C, 4F and 5, when the flow control valve housing 902 is affixed to the flow control valve cavity 216 of the manifold body 202 with the help of screw fasteners 520 and cap screw 518, the orifice 926 aligns with the central fluid transfer passageway 224 provided inside the manifold body 202. A close tolerance fit between the flow control valve housing 902 and flow control valve cavity 216 ensures that the fluid does not leak through the interface between the orifice 926 and the central fluid transfer passageway 224 when it flows in the direction referenced by arrows 932.

Reference to FIGS. 5, 9A-9G and 10A-10F, the flow control valve assembly 904 comprises a flow control valve spool 912, a flow control valve adjuster screw 914, a pusher screw 916, a flow adjuster spring 918, a cap nut 920 and a seal lock nut 922. The flow valve control spool 912 is slidably mounted inside the flow control valve housing chamber 906 and is operably coupled to the flow adjuster spring 918. The flow adjuster spring 918 operably positioned inside the fluid control valve housing chamber 906 exerts a biasing force on the flow control valve spool 912 urging it towards a first direction away from the orifice 926. The cap nut 920 (shown in FIGS. 10A-10B) attached to the flow control valve housing top 514 slidably receives the flow adjusting screw 914 (914 is also shown in FIGS. 10C-10E). Pusher screw 916, also shown in FIG. 10F, is operably coupled to the seal lock nut 922 through the cap nut 920. On being actuated by a servo control motor 930, the flow adjuster screw 914 moves downward or upward thereby making the flow control valve spool 912 slide downward or upward inside the flow control valve housing chamber 906 with the help of the pusher screw 916. The position of the flow control valve spool 912 is adjustable to any selected position with respect to the orifice 926 between a first position in which the flow control valve spool 912 completely blocks the orifice 926 and a second position in which the flow control valve spool 912 completely opens the orifice 926 to obtain a desired rate of flow.

An annular space 928 located below the seal lock nut 922 is defined by the flow control valve spool 912 and the flow control valve housing 902. An annular space inlet 934 is provided in the flow control valve housing 902 which connects the annular space 928 to a fluid passage disposed on the manifold body 202. This fluid passage originates from the central fluid transfer passageway 224 on the upstream side of the flow control valve 104.

Flow control valve 104 permits independent release of pressurized fluid thereby effectively controlling the rate of flow of fluid flowing through the flow control valve outlet 910. The flow rate may be controlled manually or automatically. Where the flow control valve 104 is operated manually, a visual indicator responsive to the output signal generated by the flow meter 106 may be provided. Typically the visual indicator would be comprised of a gauge that may be read by an operator to determine the flow rate measured by the flow meter. The operator is then presented with the ability to manually adjust the flow control valve 104 in accordance with fluctuations in the readings presented by the gauge, and to thereby maintain the flow of fluid as measured by the flow meter 106 within pre-determined limits. When the flow rate control is automated, the servo control motor 930 gets output signals generated by the flow meter 106.

Reference to FIGS. 3B, 4D, 5 and 11A-11D, the flow meter 106 of the present invention comprises a pressure transducer 524 and a pitot tube assembly 1100. The pitot tube assembly 1100 further comprises a locator 1102, a pitot tube 1103 and a pitot tube housing 526. The pitot tube 1103 is a substantially L-shaped tube having a pitot tube top end 1112 that remains in fluid communication with the pressure transducer 524, and a pitot tube orifice 1106 located at the pitot tube distal end 1114. The locator 1102, with the help of pitot tube housing 526, holds the pitot tube 1103 inside the central fluid transfer passageway 224 in such way that the pitot tube orifice 1106 faces the flow on the upstream side of the flow meter 106 at the center of the passageway 224.

The flow meter 106 works on the principle that the fluid entering through the pitot tube orifice 1106 placed at the central fluid transfer passageway 224 rises through the pitot tube 1103 and comes to rest and the consequent loss of kinetic energy gets converted to a measurable increase in pressure inside the pitot tube 1103. The pressure transducer 524 coupled to the pitot tube 1103 with the help of locator 1102 and seal nut 1110 converts this pressure into a measurable electrical signal which, in turn, can be fed to a control unit/microprocessor unit. The signal generated by the pressure transducer 524 is proportional to the change in pressure inside the pitot tube 1103. Rate of flow is equal to product of area of the fluid path and the fluid velocity. Since, in the present case area of the pitot tube orifice 1106 is constant, the velocity of flow in the central fluid transfer passageway 224 is proportional to flow rate. Therefore, by calibrating the pressure sensed by the pressure transducer 524 against flow rate, flow rate can be directly read in any desirable volumetric flow rate unit such as LPM/GPM on a monitor.

Reference to FIGS. 2A-2F and 3A-3C, the flow diverter 108 of the integrated variable pressure and flow regulator 100 enables selective diversion of the fluid to any desired fluid line as it leaves the integrated variable pressure and flow regulator 100 through a plurality of manifold outlet ports 226 disposed at the manifold distal end 209. As further illustrated in FIGS. 4E, 5 and 12A-12H, the flow diverter 108 comprises a flow lever diverter knob 412, a diverter valve 414 and a diverter valve spacer 416.

Reference to FIGS. 2A-2F, 3A-3C, 4E and 12A-12H, the diverter valve 414 has a substantially cylindrical body having a diverter valve top end 1202 adapted to fit inside the diverter knob chamber 1212 of the flow lever inverter knob 532, a diverter valve middle section 1203 adapted to fit with the diverter valve spacer 416 and a diverter bottom end 1204 adapted to rotatably fit inside the flow control valve cavity 220 with close tolerance fit to prevent any fluid leakage.

As illustrated in FIGS. 2A-2F, 3A-3C, 4E and 12A-12E, the diverter valve 414 is rotatably held inside the flow diverter cavity 220 of the manifold body 202 with the help of diverter valve spacer 416, which secures the diverter valve 414 at a desired radial distance inside the flow diverter cavity wall 210, and diverter ball 542 which supports the diverter valve 414 at its bottom face 1208 with respect to the flow diverter cavity 220. The diverter valve 414 is operably coupled with a rotary actuator/solenoid 418 at its top end 1202 with the help of a flow lever diverter knob 412 and retaining ring 534. The rotary actuator 418 is affixed to the manifold body 202 with the help of studs 540.

As shown in FIGS. 12A-12E, a diverter valve internal passage 1210 is disposed at the diverter valve bottom end 1204. In some embodiments, the diverter valve internal passage 1210 comprises a diverter valve first port 1214 and a diverter valve second port 1216 which meet each other at the longitudinal axis A1-A1 at an angle (at an angle 135 degrees, for example) as shown in FIG. 12D. The diverter valve internal passage 1210 may be formed by drilling two bores into the diverter valve bottom end 1204 at an angle relative to each other.

The diverter valve internal passage 1210 may be controllably aligned with the manifold ports 223, 226A and 226B to form a fluid connection between pairs of ports. For example, the diverter valve internal passage 1210 may be rotated, on being actuated by the rotary actuator 418, into alignment with either flow diverter cavity inlet 223 and first manifold outlet port 226A, or flow diverter cavity inlet 223 and second manifold outlet port 226B, as desired.

Figure 13:
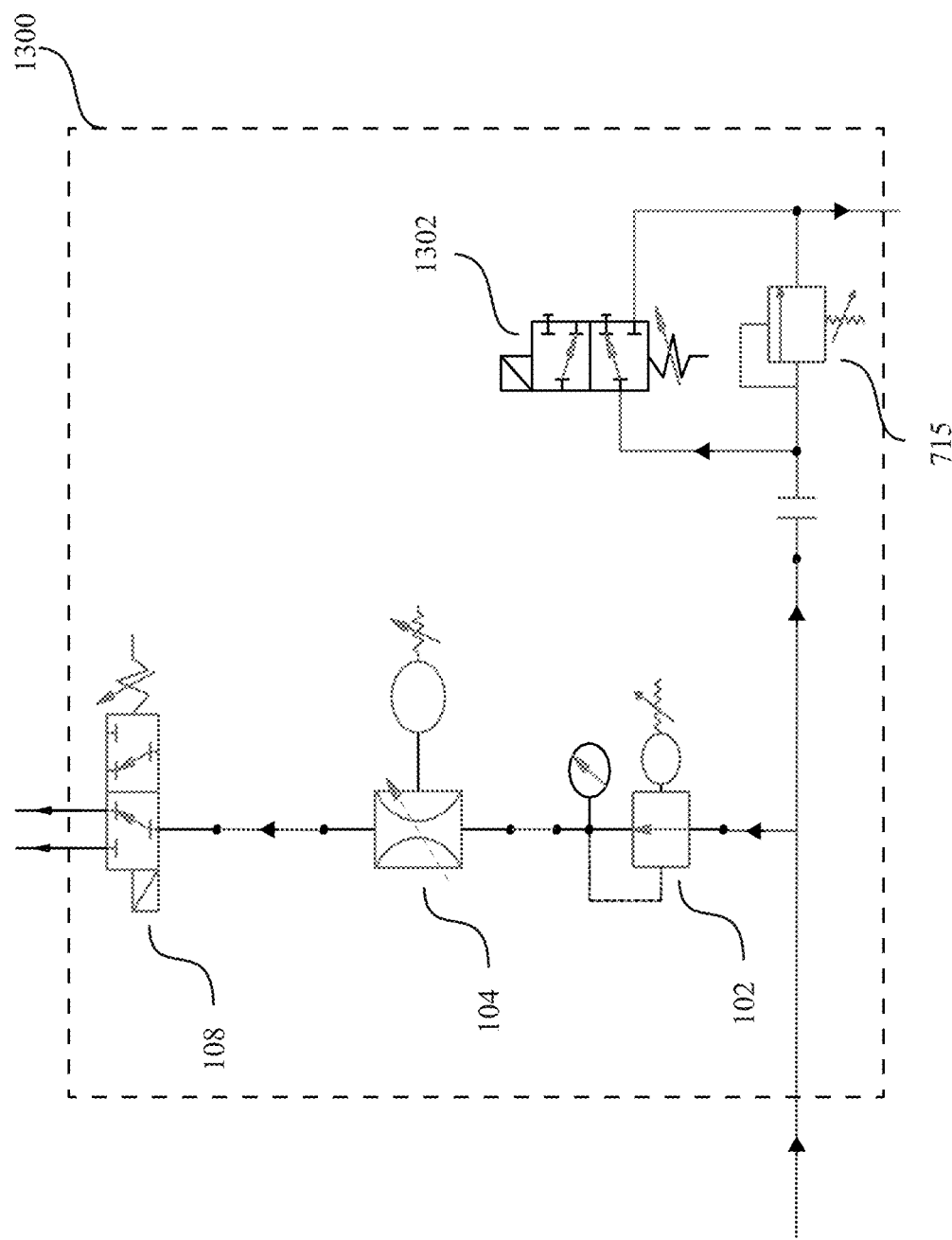
FIG. 13 is a schematic flow diagram illustrating pressure and flow regulation with the help of the integrated variable pressure and flow regulator of the present invention.

FIG. 13 illustrates a schematic flow diagram 1300 for the integrated variable pressure and flow regulator 100. The integrated variable pressure and flow regulator 100 allows achieving a desired flow rate at its outlets (226A or 226B) irrespective of the flow rate of the fluid entering the regulator 100 at its inlet 707. So, in case of a pump supplying the fluid at a flow rate of 1 GPM/3.75 LPM at the inlet 707 and the integrated variable pressure and flow regulator 100 reducing the flow rate to 0.7 GPM, then the excess 0.3 GPM of fluid needs to be released from the integrated variable pressure and flow regulator 100. The pressure relief valve section 715 does this by letting the excess fluid exit through the relief valve exit 752 in the direction indicated by arrow 1402 as shown in FIG. 14B if the fluid pressure exceeds the relief set pressure. Reference to FIG. 7, the fluid entering the high pressure valve housing chamber 744 through the inlet 707 also exerts pressure on the relief valve 738 which blocks the pressure relief valve aperture 756 biased by spring force of relief valve spring 740. If the pressure exerted on the relief valve 738 from the high pressure housing chamber 744 side exceeds the set pressure of the relief valve section 715 i.e. the biasing fourth control force, the relief valve 738 moves away from the relief valve aperture 756 and the excess fluid (0.3 GPM in the present case) makes way to the relief valve exit 752 through the relief valve housing chamber 750. The setting of the pressure relief valve section 715 can be adjusted by adjusting the compression of the relief valve spring 740. To prevent damage to the fluid circuit from any accidental/unwarranted pressure rise the pressure relief valve section 715 can be pre-set at the maximum operating pressure of the pump that supply the fluid to the inlet 707.

Optionally, as shown in FIG. 13, an unloading valve 1302 can also be incorporated in the fluid circuit parallel to the pressure relief valve section 715 so that the pump supplying the fluid can remain on and all of the fluid can bypass the integrated variable pressure and flow regulator 100 and go back to the source when the fluid demand is nil.

Figure 15B:
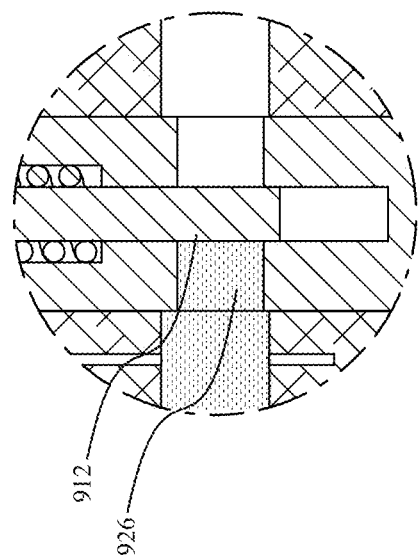
FIG. 15B is an enlarged view of the portion of the valve spool in closed position as illustrated in FIG. 14B and identified as detail 15B in FIG. 14B.
Figure 15A:
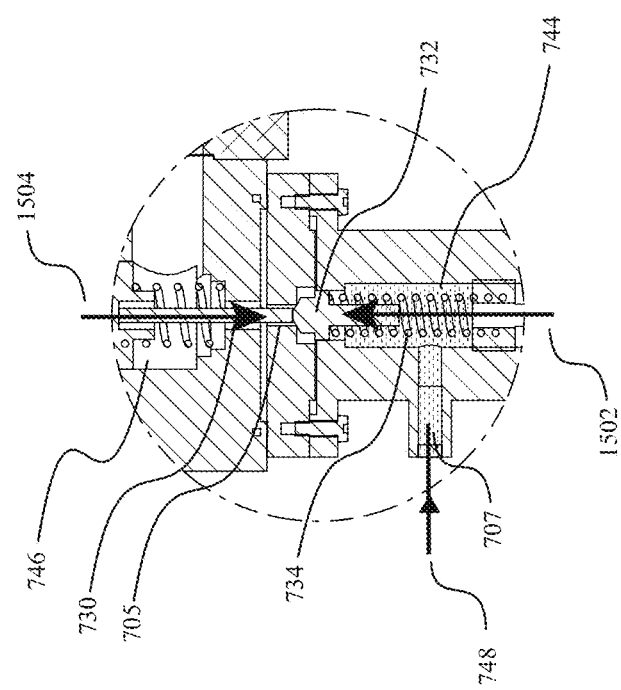
FIG. 15A is an enlarged view of the portion of the high pressure valve in closed position as illustrated in FIG. 14B and identified as detail 15A in FIG. 14B.

Reference to FIGS. 7, 14B and 15A-15B, the fluid entering the integrated variable pressure and flow regulator 100 at an inlet fluid pressure (1000 PSI, for example) and inlet fluid flow rate (1 GPM, for example) through the pressure reducer inlet 707 fills the high pressure valve housing chamber 744 and exerts a first hydraulic force underside the high pressure valve 732. This first hydraulic force combines with the third control force exerted by the high pressure valve spring 734 on the underside of the high pressure valve 732. On the other side, the fluid present in the fluid chamber 746 exerts a second hydraulic force on the underside of the reducer valve piston 726 which combines with the second control force exerted by the retainer spring 728 placed below the reducer valve piston 726. All of these forces i.e. the second control force, the third control force, the first hydraulic force and the second hydraulic force, hereinafter together referred to as combined upward force 1502, act in a second direction against the first control force, hereinafter referred to as combined downward force 1504, exerted in the first direction by the pressure adjusting spring 710. So, as long as the outlet fluid pressure, also referred to as fluid transfer passageway pressure inside the fluid transfer passageway 224, is equal to the reducer pressure setting in the pressure regulator 102 the combined forces exerted in the first direction and in the second direction on the high pressure valve 732 remain in equilibrium and the high pressure valve 732 is held at a specific position with respect to the pressure reducer fluid passage 705. FIG. 15A illustrates high pressure valve 732 in closed position under such an equilibrium. The help of pressure adjusting screw 714 is actuable by the remote reducer control mechanism 716 at any incremental value. FIG. 15B illustrates flow control valve spool 912 completely closing the orifice 926 that stops the flow downstream.

Figures 16A, 16B:
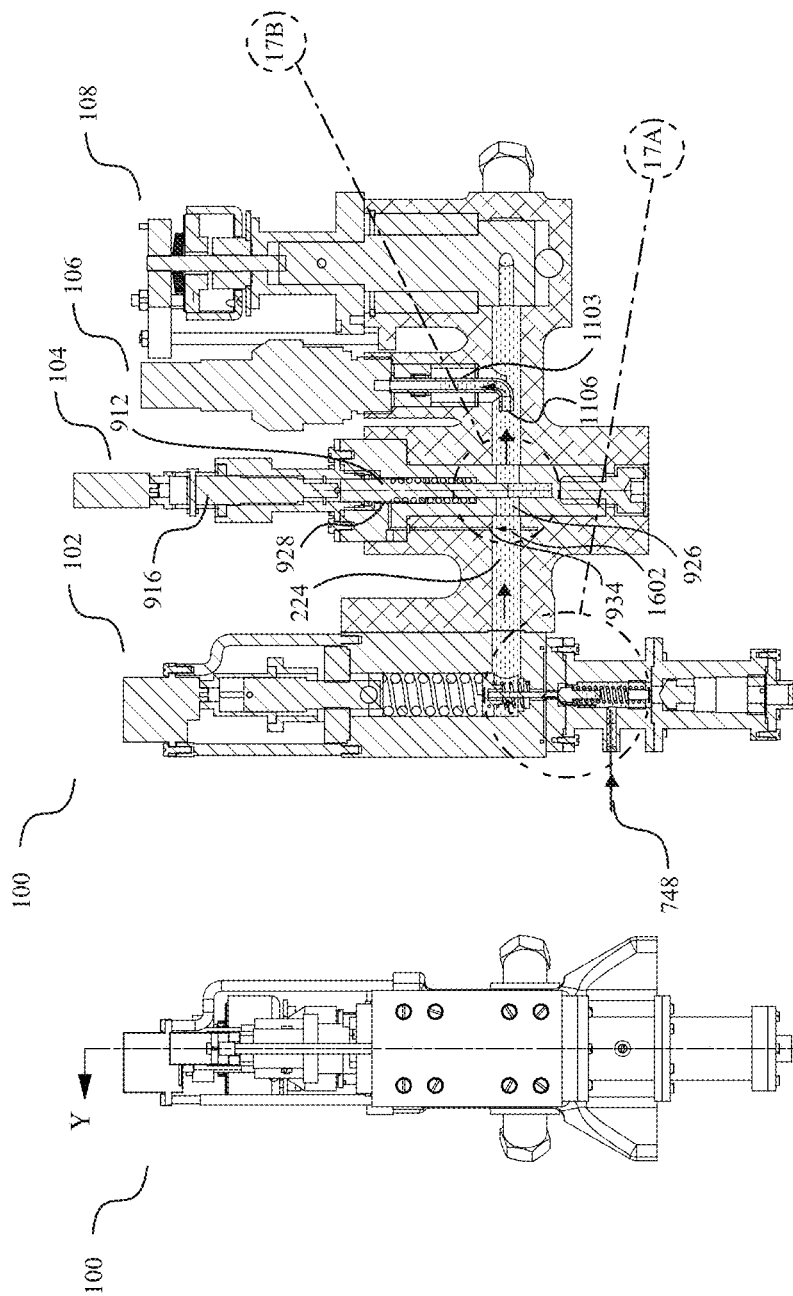
FIG. 16A is a left side elevation view of the integrated variable pressure and flow regulator of the present invention in partially open position.
FIG. 16B is a cross-sectional view of the integrated variable pressure and flow regulator of the present invention of FIG. 16A taken along line Y-Y thereof.
Figure 17B:
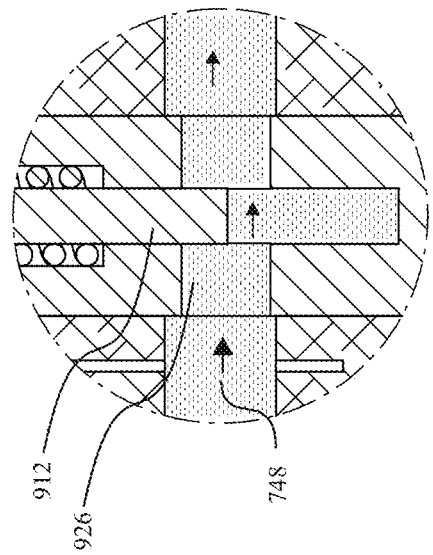
FIG. 17B is an enlarged view of the portion of the valve spool in partially open position as illustrated in FIG. 16B identified as detail 17B in FIG. 16B.
Figure 17A:
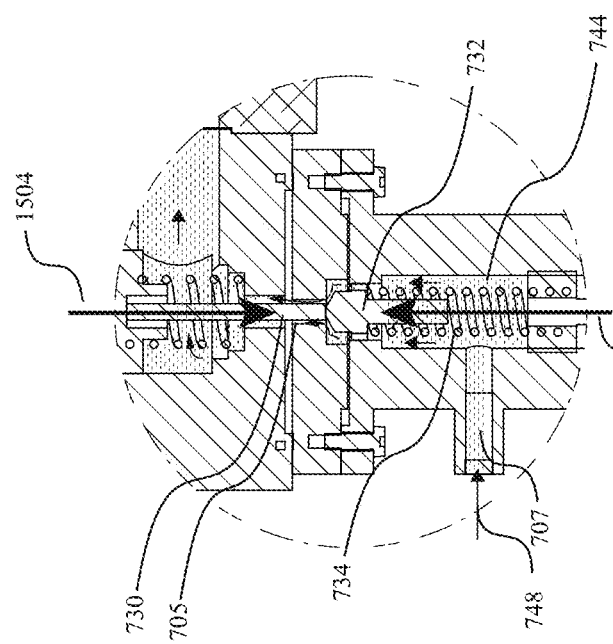
FIG. 17A is an enlarged view of the portion of the high pressure valve in partially open position as illustrated in FIG. 16B identified as detail 17A in FIG. 16B.
Figures 18A, 18B:
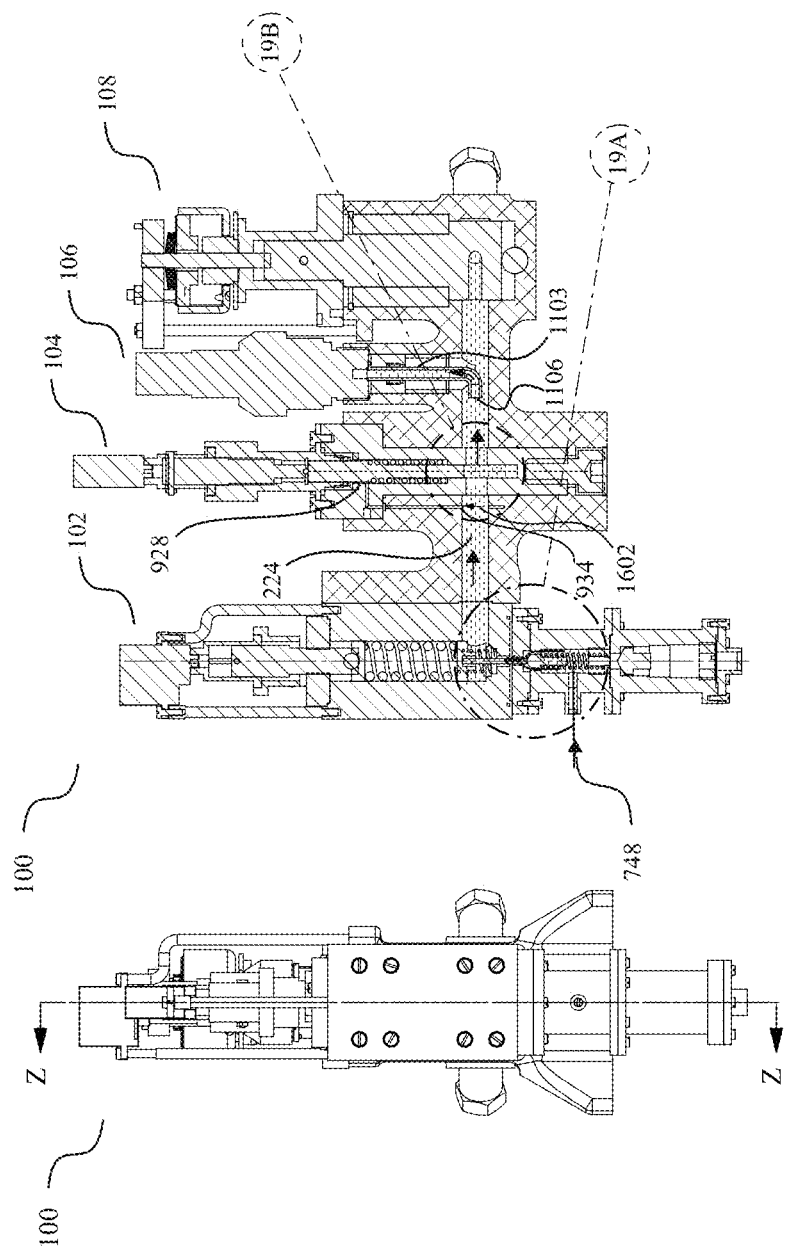
FIG. 18A is a left side elevation view of the integrated variable pressure and flow regulator of the present invention in fully open position.
FIG. 18B is a cross-sectional view of the integrated variable pressure and flow regulator of the present invention of FIG. 18A taken along line Z-Z thereof.
Figure 19B:
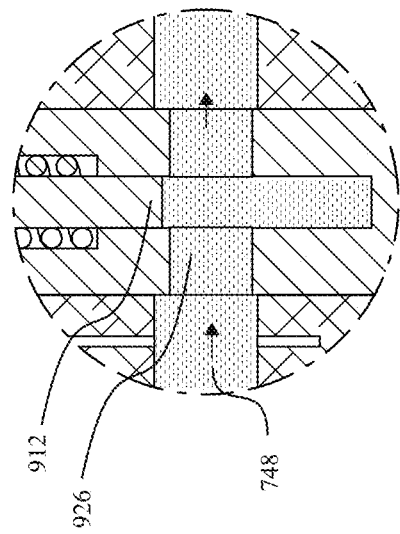
FIG. 19B is an enlarged view of the portion of the valve spool in completely open position as illustrated in FIG. 18B identified as detail 19B in FIG. 18B.
Figure 19A:
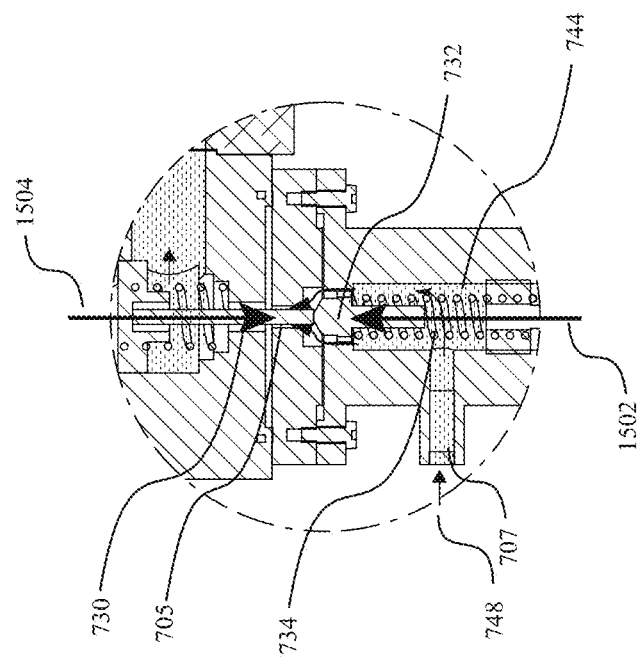
FIG. 19A is an enlarged view of the portion of the high pressure valve in completely open position as illustrated in FIG. 18B identified as detail 19A in FIG. 18B.

The pressure regulator 102 reduces the inlet fluid pressure (1000 PSI, for example) to an outlet fluid pressure (500 PSI, for example) as per the reducer pressure setting and maintains this outlet fluid pressure irrespective of the fluid pressure and flow demand downstream i.e. at the manifold outlet ports 226. When the demand for the fluid increases in the downstream side of the integrated fluid pressure and flow control system 100, the outlet fluid pressure i.e. fluid transfer passageway pressure decreases inside the fluid control transfer passageway 224 momentarily. The resulting decrease in pressure inside the fluid chamber 746 decreases the combined upward force 1502 causing imbalance in the force equilibrium maintained so far inside the pressure regulator 102. FIGS. 16A-16B and 17A-17B depict such a situation in which the combined downward force 1504 has overcome the combined upward force 1502 due to decrease in outlet fluid pressure inside the fluid control passageway 224 and the high pressure valve 732 is pushed away from the pressure reducer fluid passage 705 by the pusher rod 730 leaving the pressure reducer fluid passage 705 partially open. Further reduction of fluid pressure in the fluid chamber 746 results in further pushing of the high pressure valve 732 leaving the pressure reducer fluid passage 705 fully open as illustrated in FIGS. 18B and 19A.

Reference to FIGS. 16A-16B, 17A-17B, 18A-18B and 19A-19B, the high pressure valve 732 is pushed till the additional spring force arising due to compression of the high pressure valve spring 734 helps the combined upward force 1502 to equalize the combined downward force 1504. At this condition the fluid starts flowing through the pressure reducer fluid passage 705 from the high pressure valve housing chamber 744 to the fluid chamber 746 till the time outlet fluid pressure in the fluid chamber 746 i.e. in the fluid transfer passageway 224 reaches the desired level i.e. the reducer pressure setting as set in the pressure regulator 102. As soon as the outlet fluid pressure equals to the reducer pressure setting in the fluid chamber 746, the force equilibrium gets restored and the high pressure valve 732 goes back to block the pressure reducer fluid passage 705. The time required to restore the desired outlet fluid pressure in the fluid chamber 746, thus in the fluid control transfer passageway 224, is referred to as response time and it is just a fraction of a second in the present invention.

As described above, the pressure regulator 102 of the integrated variable pressure and flow regulator 100 can help maintain a desired fluid pressure in the downstream side. The desired level of fluid pressure can be varied by changing the compression of the pressure adjusting spring 710 which, in turn, changes the combined downward force 1504 acting on the high pressure valve 732. The change in compression in the pressure adjusting spring 710 can be introduced through the pressure adjusting screw 714. Screwing i.e. lowering of the pressure adjusting screw 714 increases the compression in the pressure adjusting spring 710 which results in increase of the reducer pressure setting i.e. the fluid pressure to be maintained downstream. Unscrewing i.e. raising of the pressure adjusting screw 714 decreases the compression of the pressure adjusting spring 710 which results in decrease in the reducer pressure setting i.e. the fluid pressure to be maintained downstream. The screwing or unscrewing of the pressure adjusting screw 714, at any incremental value, can be done by actuating the remote reducer control mechanism 716. The remote reducer control mechanism 716 can be a servo control motor remotely operable from an electrical control and/or programmable microprocessor control.

In the conventional hydraulic systems/circuits, fluid pressure and flow rate are inter-dependent. The present invention enables independent control of the fluid pressure and flow rate without affecting one another i.e. fluid pressure can be increased or decreased keeping the flow rate unchanged or vice-versa. While the pressure regulator 102 helps in obtaining a desired fluid pressure, the flow control valve 104 enables control of the flow rate independent of the fluid pressure. Reference to FIGS. 9A-9F, 16B, 17B, 18B and 19B, the flow rate travelling through the fluid transfer passageway 224 can be changed by increasing or decreasing the opening of the orifice 926. The position of the flow control valve spool 912 is adjustable to any selected position with respect to the orifice 926 between a first position, as shown in FIGS. 14B and 15B, in which the flow control valve spool 912 completely blocks the orifice 926 and a second position, as shown in FIGS. 18B and 19B, in which the flow control valve spool 912 completely opens the orifice 926 to obtain a desired rate of flow. A half-open orifice 926 is shown in FIGS. 16B and 17B. The position of the flow control valve spool 912 with respect to the orifice 926 for all of such conditions can be incrementally set by actuating the servo control motor 930.

The flow rate inside the fluid transfer passageway 224 is equal to the product of the area of the orifice 926 and velocity of the fluid through the orifice (flow rate = area of orifice x velocity of fluid). If the fluid pressure in the fluid transfer passageway 224 is increased by setting the pressure regulator 102 to a higher pressure value as per requirement, the velocity of fluid travelling through the orifice 926 also consequently increases. The opposite happens when the pressure is reduced. Thus, for every flow rate setting i.e. for the pre-set opening of the orifice 926 or pre-set position of the flow control valve spool 912, the flow rate can momentarily increase or decrease from the desired outlet fluid flow rate with any increase or decrease of the outlet fluid pressure in the fluid transfer passageway 224.

The flow control valve 104 has a built-in mechanism to immediately adjust the flow rate in response to the change in outlet fluid pressure to bring it to the desired level of outlet fluid flow rate as per a flow rate setting. As the fluid flows through the fluid transfer passageway 224, the fluid enters the annular space 928 in the direction 1602 through the annular space inlet 934 which opens at the fluid transfer passageway 224 upstream of the orifice 926. With any increase in fluid pressure in the fluid transfer passageway 224 upstream of the flow control valve 104, the fluid pressure inside the annular space 928 also increases proportionately. This increase in pressure inside the annular space 928 makes the flow control valve spool 912 move downward against the biasing force of the flow adjuster spring 918 to close the orifice 926 further thereby reducing the opening of the orifice 926. The reduction in area/opening of the orifice 926 quickly brings down the flow rate to the previously set value of outlet fluid flow rate. Thus, any increase in flow rate due to increase in fluid pressure is automatically cancelled out. Similarly, decrease in flow rate due to decrease in fluid pressure in the central fluid transfer passageway 224 is automatically brought to the outlet fluid flow rate by increasing the opening area of the orifice 926. The increase in opening area of the orifice 926 happens due to upward movement of the flow control valve spool 912 with reduction of fluid pressure in the annular space 928 assisted by the biasing force of the flow adjuster spring 918. Thus, irrespective of the fluid pressure in the orifice 926 or in the central fluid transfer passageway 224, the flow control valve 104 maintains a constant outlet fluid flow rate downstream as required.

FIGS. 16B and 18B show the rise of fluid inside the pitot tube 1103. This rise of fluid inside the pitot tube 1103 and the consequent increase in pressure is sensed by the pressure transducer 524. The electrical signal generated by the pressure transducer 524 can be used to measure the flow rate inside the fluid transfer passageway 224.

Finally, the flow diverter 108 allows directing the fluid at the outlet fluid pressure and outlet fluid flow rate to flow out through any of the outlet ports (through 226A or 226B in the present example) and go to a desired section of the fluid system/circuit.

The compact single-unit design of the integrated variable pressure and flow regulator of the present invention reduces size and volume of the device along with the reduction in cost of tubing, fittings, requirement of smaller mounting space, less number of components, timing, hardware and labour. The present invention is largely maintenance free as fittings are minimized and any of its components can be easily replaced as and when required.

It is to be understood that the term fluid used herein applies to liquids, gases, and slurries comprising any combination of matter or substance to which controlled flow may be of interest.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All functions/processes/methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

What is claimed is:

1. An integrated variable pressure and flow regulator comprising:
   a manifold body comprising a coupling face, a flow control valve cavity, a flow meter cavity, a flow diverter cavity and a central fluid transfer passageway, said central fluid transfer passageway being defined to put a manifold inlet disposed at a proximal end of said manifold body in fluid communication with one or more manifold outlet ports disposed at a manifold distal end through said flow control valve cavity, said flow meter cavity and said flow diverter cavity;
   a pressure regulator attached to said coupling face, said pressure regulator having a pressure regulator housing body, a reducer pressure setting assembly and a high pressure valve assembly, wherein said reducer pressure setting assembly and said high pressure valve assembly are configured to maintain an outlet fluid pressure, as per a reducer pressure setting which is less than an inlet fluid pressure, at said one or more manifold outlet ports for a fluid flow received through a reducer inlet disposed at said pressure regulator housing body at said inlet fluid pressure;

a flow control valve operatively received by said flow control valve cavity, said flow control valve comprising a flow control valve housing and a flow control valve assembly, wherein said flow control valve assembly is configured to maintain an outlet fluid flow rate, as per a flow rate setting, for said fluid flow at said outlet fluid pressure;

a flow meter received by said flow meter cavity, said flow meter being configured to generate an output signal proportionate to said outlet fluid flow rate; and a flow diverter received by said flow diverter cavity, said flow diverter configured to enable a selective diversion of said fluid flow at said outlet fluid pressure and said outlet fluid flow rate through any of said one or more manifold outlet ports.

2. The integrated variable pressure and flow regulator of claim 1, wherein a high pressure valve of said high pressure valve assembly blocks a pressure reducer fluid passage disposed in said pressure regulator housing body as long as a force equilibrium exists between a combined downward force and a combined upward force produced by said reducer pressure setting assembly and said high pressure valve assembly.

3. The integrated variable pressure and flow regulator of claim 2, wherein a pressure adjustable screw is actuable by a remote reducer control mechanism to adjust said combined downward force.

4. The integrated variable pressure and flow regulator of claim 1, wherein said pressure regulator further comprises a pressure relief valve section configured to establish a relief fluid path to release said fluid flow at a relief set pressure equal to or less than said inlet fluid pressure.

5. The integrated variable pressure and flow regulator of claim 1, wherein a fluid control valve spool of said flow control valve assembly is adjustable to any selected position with respect to an orifice disposed in said flow control valve housing for said flow rate setting.

6. The integrated variable pressure and flow regulator of claim 5, wherein a change in a fluid pressure inside an annular space caused by a change in said outlet fluid pressure changes a position of said fluid control valve spool with respect to said selected position to maintain said outlet fluid flow rate, said annular space being defined by said flow control valve spool and said flow control valve housing.

7. The integrated variable pressure and flow regulator of claim 1, wherein said flow meter comprises a pitot tube and a pressure transducer, said pitot tube being operatively connected to said pressure transducer at a pitot tube top end of said pitot tube and an orifice of said pitot tube being placed inside said central fluid transfer passageway.

8. The integrated variable pressure and flow regulator of claim 1, wherein said flow diverter comprises a flow lever diverter knob, a diverter valve and a diverter valve spacer.

9. The integrated variable pressure and flow regulator of claim 8, wherein a diverter valve internal passage defined in said diverter valve is controllably aligned with either a flow diverter cavity inlet and a first manifold outlet port of said one or more manifold outlet ports or with said flow diverter cavity inlet and a second manifold outlet port of said one or more manifold outlet ports as required for effecting said selective diversion of said fluid flow, said flow diverter cavity inlet being disposed in said flow diverter cavity.

* * * * *